US007361088B2

(12) United States Patent
Maya et al.

(10) Patent No.: US 7,361,088 B2
(45) **Date of Patent: *Apr. 22, 2008**

(54) GAMING DEVICE HAVING A GAME WITH INCREMENTAL VALUE DISCLOSURE AND VALUE MODIFICATION

(75) Inventors: Darren Maya, Reno, NV (US); Joseph E. Kaminkow, Reno, NV (US)

(73) Assignee: IGT, Reno, NV (US)

( * ) Notice: Subject to any disclaimer, the term of this patent is extended or adjusted under 35 U.S.C. 154(b) by 299 days.

This patent is subject to a terminal disclaimer.

(21) Appl. No.: 10/661,209

(22) Filed: Sep. 12, 2003

(65) Prior Publication Data

US 2004/0077403 A1 Apr. 22, 2004

Related U.S. Application Data

(63) Continuation-in-part of application No. 10/447,779, filed on May 29, 2003, now Pat. No. 6,811,485, which is a continuation of application No. 09/627,198, filed on Jul. 27, 2000, now Pat. No. 6,582,306.

(51) Int. Cl.
*A63F 13/00* (2006.01)
*A63F 13/10* (2006.01)

(52) U.S. Cl. ............................ 463/20; 463/16; 463/21

(58) Field of Classification Search ............ 463/10–13, 463/16–19, 20, 22, 25, 30–32, 40, 42, 9, 463/21; 273/292

See application file for complete search history.

(56) References Cited

U.S. PATENT DOCUMENTS 4,353,554 A 10/1982 Fisher
4,560,161 A 12/1985 Hamano
4,624,459 A 11/1986 Kaufman
4,645,053 A 2/1987 Kitayama
4,991,848 A 2/1991 Greenwood et al.
5,116,055 A 5/1992 Tracy
5,205,555 A 4/1993 Hamano
5,449,173 A 9/1995 Thomas et al.

(Continued)

FOREIGN PATENT DOCUMENTS

EP 0926645 A2 6/1999

(Continued)

OTHER PUBLICATIONS

Japanese patent JP02003010478A, Game Machine, Sugijima, et al., Jan. 14, 2003.*

(Continued)

*Primary Examiner*—Robert E. Pezzuto
*Assistant Examiner*—Matthew D. Hoel
(74) *Attorney, Agent, or Firm*—Bell, Boyd & Lloyd LLP

(57) ABSTRACT

A gaming device having a game which involves the disclosure of various values to a player in increments. The player selects one or more symbols, and the game incrementally discloses values associated with such symbols. The gaming device determines an amount based on the disclosed values. In addition, the gaming device enables the player to affect the award based on this amount by making one or more inputs. This type of gaming device increases player excitement and enjoyment.

47 Claims, 25 Drawing Sheets

U.S. PATENT DOCUMENTS

| | | | | |
|---|---|---|---|---|
| 5,456,465 | A | 10/1995 | Durham | |
| 5,494,287 | A | 2/1996 | Manz | |
| 5,524,888 | A | 6/1996 | Heidel | |
| 5,664,999 | A * | 9/1997 | Kurihara | 463/20 |
| 5,766,074 | A | 6/1998 | Cannon et al. | |
| 5,855,514 | A | 1/1999 | Kamille | |
| 5,997,401 | A | 12/1999 | Crawford | |
| 6,004,207 | A | 12/1999 | Wilson, Jr. et al. | |
| 6,015,346 | A | 1/2000 | Bennett | |
| 6,033,307 | A | 3/2000 | Vancura | |
| 6,059,289 | A | 5/2000 | Vancura | |
| 6,089,976 | A | 7/2000 | Schneider et al. | |
| 6,102,798 | A | 8/2000 | Bennett | |
| 6,142,874 | A | 11/2000 | Kodachi et al. | |
| 6,162,121 | A | 12/2000 | Morro et al. | |
| 6,179,711 | B1 | 1/2001 | Yoseloff | |
| 6,231,445 | B1 | 5/2001 | Acres | |
| 6,299,165 | B1 | 10/2001 | Nagano | |
| 6,315,660 | B1 | 11/2001 | DeMar et al. | |
| 6,315,663 | B1 * | 11/2001 | Sakamoto | 463/20 |
| 6,406,369 | B1 * | 6/2002 | Baerlocher et al. | 463/20 |
| 6,439,995 | B1 | 8/2002 | Hughs-Baird et al. | |
| 6,454,651 | B1 | 9/2002 | Yoseloff | |
| 6,471,588 | B2 * | 10/2002 | Sakamoto | 463/20 |
| 6,494,785 | B1 * | 12/2002 | Gerrard et al. | 463/20 |
| 6,506,118 | B1 * | 1/2003 | Baerlocher et al. | 463/25 |
| 6,582,306 | B1 | 6/2003 | Kaminkow | |
| 6,589,114 | B2 * | 7/2003 | Rose | 463/20 |
| 7,040,982 | B1 * | 5/2006 | Jarvis et al. | 463/9 |
| 2001/0041611 | A1 * | 11/2001 | Sakamoto | 463/20 |
| 2001/0049288 | A1 * | 12/2001 | Seon | 455/452 |
| 2001/0049298 | A1 * | 12/2001 | Bennett | 463/16 |
| 2002/0026404 | A1 * | 2/2002 | Thompson | 705/37 |
| 2002/0065127 | A1 * | 5/2002 | Kamimura et al. | 463/20 |
| 2002/0193158 | A1 * | 12/2002 | Weiss et al. | 463/16 |
| 2003/0027619 | A1 * | 2/2003 | Nicastro, Sr. | 463/16 |
| 2003/0144052 | A1 * | 7/2003 | Walker et al. | 463/20 |
| 2006/0205499 | A1 * | 9/2006 | Jarvis et al. | 463/30 |
| 2006/0205501 | A1 * | 9/2006 | Jarvis et al. | 463/30 |
| 2006/0211469 | A1 * | 9/2006 | Jarvis et al. | 463/16 |

FOREIGN PATENT DOCUMENTS

| | | | |
|---|---|---|---|
| EP | 0 944 030 | A2 * | 9/1999 |
| EP | 0944030 | A2 | 9/1999 |
| EP | 0945837 | A2 | 9/1999 |
| EP | 0984409 | A2 | 3/2000 |
| JP | 54-074472 | A * | 6/1979 |
| WO | WO 9730768 | | 8/1997 |
| WO | WO 9732285 | | 9/1997 |

OTHER PUBLICATIONS

Winning Bid Brochure written by WMS Gaming, Inc., published prior to 2000.

Winning Bid Brochure written by WMS Gaming, Inc., undated.

Mine, Mine, Mine Brochures written by Aristocrat Leisure Industries Pty. Ltd., published in 1997.

Fortune Hunter Brochure written by Aristocrat Leisure Industries Pty. Ltd., published in 1995.

Multi Progressive Game Description written by Cherry Master, published prior to 2000.

Ben Schumin, A Salute to Game Shows-The Price is Right-Pricing Games (pp. 1-42) written by http://ben-schumin.simplnet.com/-game-shows/shows/price-is-right/pricing-games.htm, published prior to 2000.

* cited by examiner

FIG. 19

| | Selected Symbol | Award Modifier | |
|---|---|---|---|
| 214 | Character A | Award Modifier A (Example: Add Consolation of 50 to Award) | 270 |
| 218 | Character B | Award Modifier B (Example: Multiply Award by 2) | 272 |
| 222 | Character C | Award Modifier C (Example: Multiply Award by 4) | 274 |

GAMING DEVICE HAVING A GAME WITH INCREMENTAL VALUE DISCLOSURE AND VALUE MODIFICATION

PRIORITY CLAIM

This application is a continuation-in-part of, claims priority to and the benefit of U.S. patent application Ser. No. 10/447,779, filed on May 29, 2003 now U.S. Pat. No. 6,811,485, entitled "Gaming Device Having Incremental Value Disclosure," which is a continuation of U.S. patent application Ser. No. 09/627,198, filed on Jul. 27, 2000, entitled "Gaming Device Having Bonus Scheme With Incremental Value Disclosure," now U.S. Pat. No. 6,582,306.

COPYRIGHT NOTICE

A portion of the disclosure of this patent document contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having a game with incremental value disclosure and value modification.

BACKGROUND OF THE INVENTION

In current gaming machines such as slot machines, players are able to receive various values associated with various events in a primary game or bonus game. For example, a player may receive a relatively high value for selecting a certain symbol and a relatively low value for selecting another symbol. When these gaming devices award players with values, they typically display the amount of values provided to the player. For example when a player selects a symbol, the game displays the numeral fifty next to the symbol or in place of the symbol, and the gaming device awards fifty value points to the player. These existing gaming devices display the total value gained at once. They do not display the total value in increments.

To increase player enjoyment and excitement, it is desirable to provide players with gaming devices which disclose the value gained or lost by a player in increments.

SUMMARY OF THE INVENTION

The present invention overcomes the above shortcomings by providing a gaming device having a game with incremental value disclosure and value modification. In one embodiment, the gaming device incrementally discloses award values to players and then modifies these award values based on inputs made by the player.

The gaming device, in one embodiment, includes a game which is initiated by a predetermined triggering event. A triggering event can be any event which triggers the beginning of a primary game or secondary game. In one embodiment, the gaming device of the present invention includes at least one and preferably a plurality of symbols or locations and one or more bonus values associated with the locations. A location includes any area, symbol or selection displayed by the gaming device. The values are preferably numbers which can be positive or negative and which can vary from location to location. The value associated with each location is the value (hereafter referred to as "value") that the game provides for any one location.

The game enables the player to select one or more of the locations. After the selection, the game displays or discloses the values in increments. Preferably the game makes this disclosure simultaneously for all of the selected locations after the player makes all of the selections. The term "increments," as used herein, includes a plurality of parts or portions of a total value.

After disclosing a portion of the total value for each location, the game pauses the disclosure for a predetermined amount of time and then resumes disclosure. The computer carries out this incremental disclosure until the game discloses the total value for each of the selected locations, until a predetermined time period elapses or until some other predetermined event occurs. The portion of the total value disclosed in a partial disclosure, the number of increments used and the duration of the pauses are predetermined or generated by the computer of the gaming device during the bonus round.

When the gaming device has completed the entire disclosure, in one embodiment the game can increase or decrease a player's balance of values by adding the total value gained (i.e., a positive value) or the total value lost (i.e., a negative value) to this balance. The game then provides the corresponding payouts to the player, and the bonus round terminates.

In one embodiment of the present invention, the primary game includes a plurality of reels which include a plurality of symbols. After a player spins the reels and they stop spinning, the reels display certain symbols. If the reels display three or more predetermined, identical symbols on adjacent reels, the gaming device initiates a bonus round.

In the bonus round, the number of locations that a player can select is equal to the number of identical symbols which triggered the bonus round. The player can make a certain number of selections equal to this number. Each time the player makes a selection, the gaming device identifies the selected location with an indicator. The gaming device discloses the total value for the selected locations, in increments preferably simultaneously after the player completes making all of the allowed selections. These increments of disclosure continue until the gaming device discloses the total value for each selected location. Then the gaming device provides the values and corresponding payout to the player. Preferably, the gaming device also reveals or displays to the player the total values for the non-selected locations which the player would have gained had the player chosen these selections.

Furthermore in this embodiment, the game displays one or more characters. Before the player makes the first selection, a character orally prompts the player to make all of the selections. Also, when the gaming device pauses the value disclosure, a character audibly informs the player of the values accumulated by the player thus far and that further disclosure is to come.

Preferably, the gaming device makes value disclosures by displaying a rolling value meter which starts and stops in accordance with the increments. One value meter is positioned adjacent to each location. Also, when the player selects a location, the gaming device displays an indicator at the selected location. Here, the indicator is an oil derrick. As the gaming device discloses values to a player, the oil derrick symbol moves, vibrates or animates in order to represent the pumping of oil.

In another embodiment, the gaming device includes a game having: (a) a group of symbols; (b) a value indicator displayed in association with each of the symbols; (c) a set of starting values, a set of intermediate values and a set of final values; and (d) a set of mathematical modifiers or award modifiers.

In operation, the gaming device enables the player to select a designated quantity of the symbols in the group. In one embodiment, each time the player selects a symbol, the gaming device, on an integer-by-integer basis, sequentially retrieves and displays: (a) one of the starting values adjacent to the selected symbol; (b) replaces the starting value with one of the intermediate values; and (c) replaces the intermediate value with one of the final values. The gaming device repeats this phase or process for each of the subsequently selected symbols.

In another embodiment, the gaming device does not display any values until the player selects all of the designated quantity of symbols. Here, preferably simultaneously for all of the selected symbols, the gaming device, on an integer-by-integer basis, sequentially retrieves and displays: (a) starting values adjacent to the selected symbols; (b) replaces the starting values with a plurality of the intermediate values; and (c) replaces the intermediate values with a plurality of the final values. In one embodiment, the gaming device performs this display of values on an alternating basis for each of the selected symbols. For example, on one or more occasions, the gaming device can alternately: (a) perform these steps (a) through (c) for one of the selected symbols; and (b) perform these steps (a) through (c) for another one of the selected symbols.

In either embodiment, once the final values are revealed, the gaming device preferably displays the final values which the player could have reached had the player chosen the non-selected symbols. In addition, the player has the opportunity to affect the award provided to the player. The player can affect the award by reselecting a designated quantity of the selected symbols. When the player reselects one or more symbols, the gaming device retrieves one of the award modifiers and applies that award modifier to the sum of the final values or to one or more of the final values. For example, if the gaming device retrieves an award modifier which is an award increaser, such as a two multiplier, the player's award would be twice the sum of the final values. After the award modifier is applied, the gaming device provides the player with the award. The gaming device then terminates the game when a termination event occurs.

The gaming device of the present invention provides an incremental manner of disclosing values to players. The gaming device discloses the values to the player in various portions. Each disclosure is separated by a pause. After disclosing the values, the gaming device enables the player to modify an award based on the values by making one or more inputs. Eventually, the gaming device provides the player with the modified award. This type of bonus scheme builds up anticipation and increases a player's excitement and enjoyment.

It is therefore an object of the present invention to provide a gaming device having a game with incremental value disclosure and value modification.

Another object of the present invention is to enable players to affect their awards by making inputs.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 19 is a table showing examples of different award modifiers associated with different selected symbols in one embodiment of the present invention.

DETAILED DESCRIPTION OF THE INVENTION

Gaming Device In General

Figure 1A:
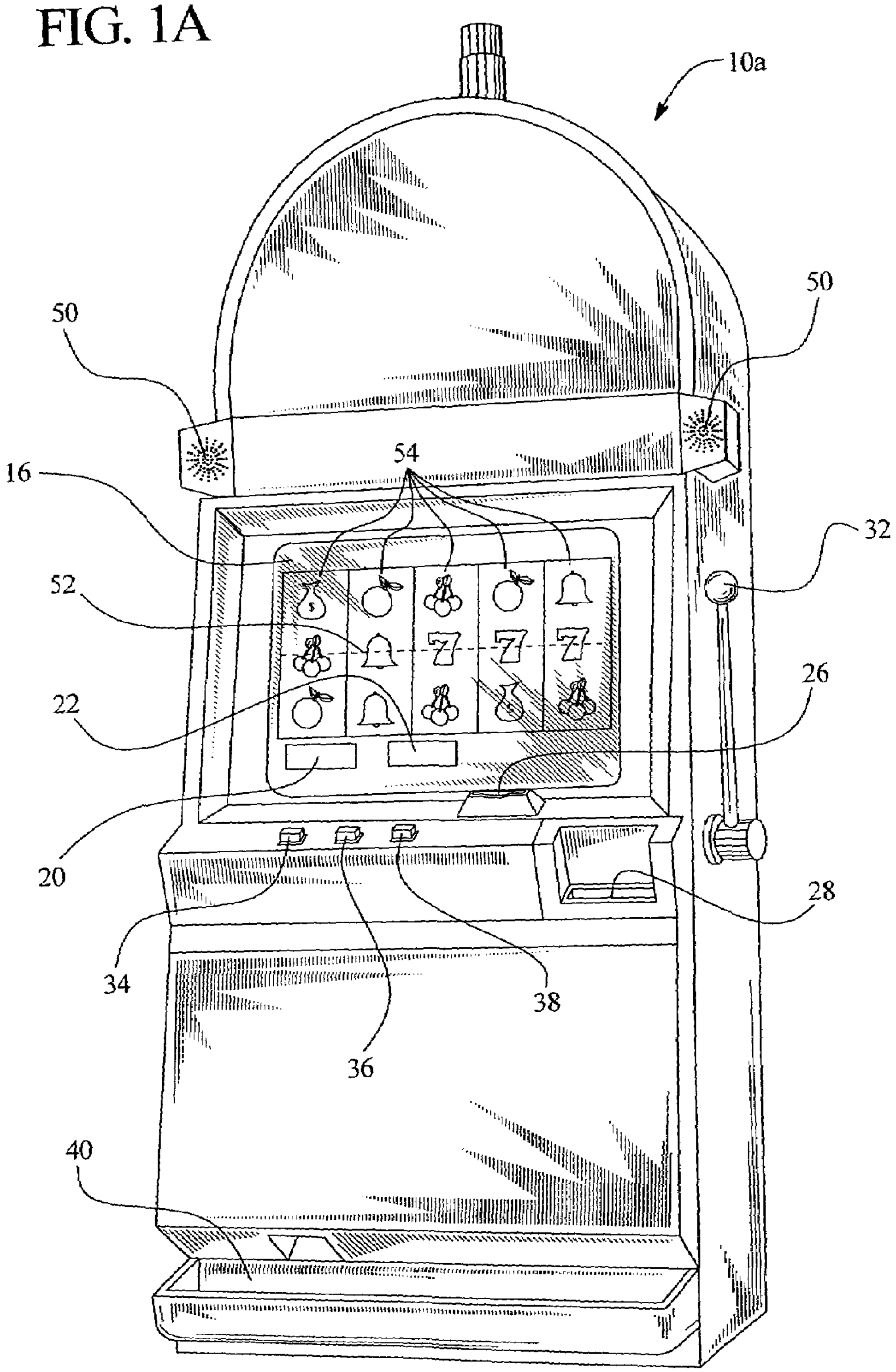
FIG. 1A is a front-side perspective view of one embodiment of the gaming device of the present invention.
Figure 1B:
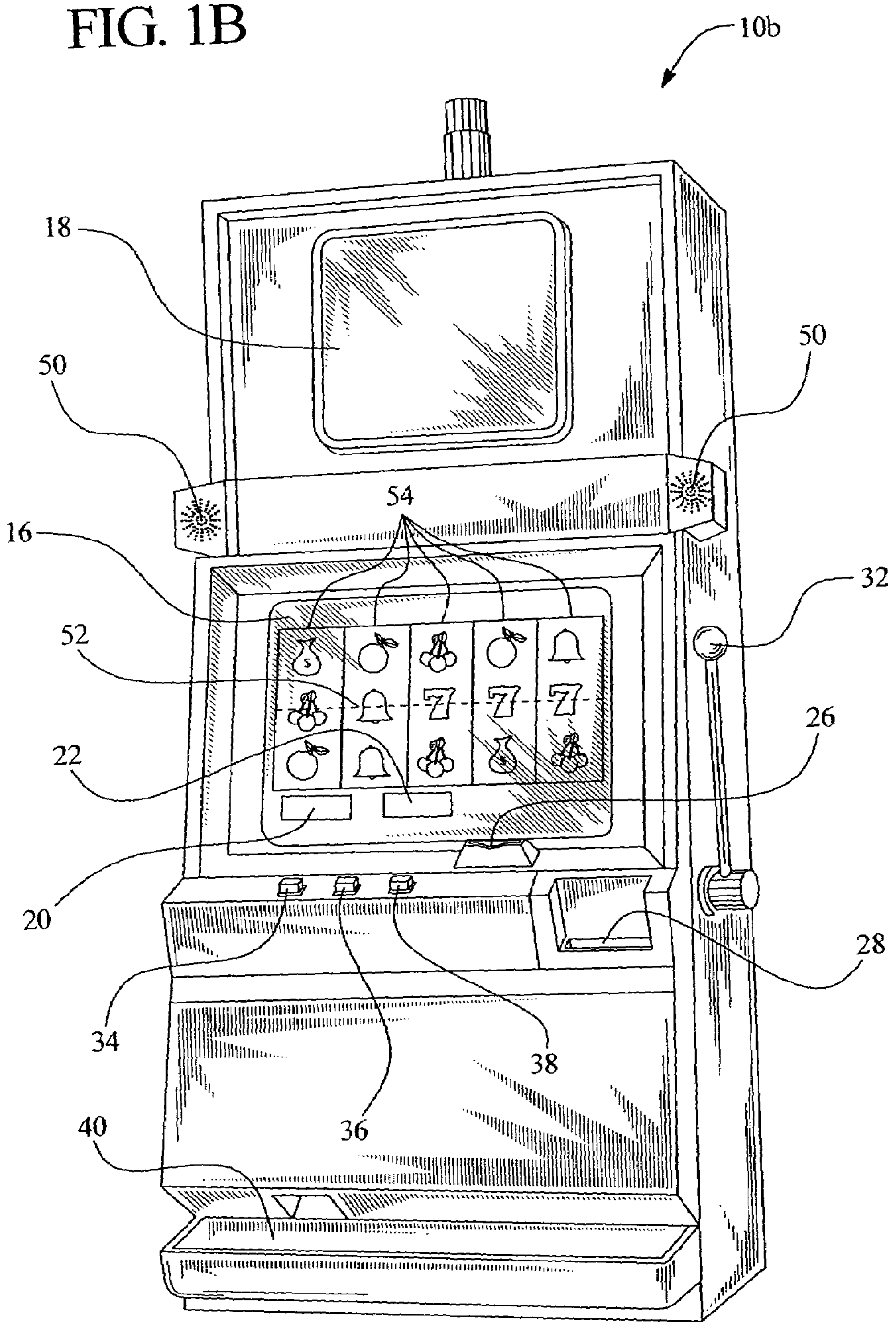
FIG. 1B is a front-side perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
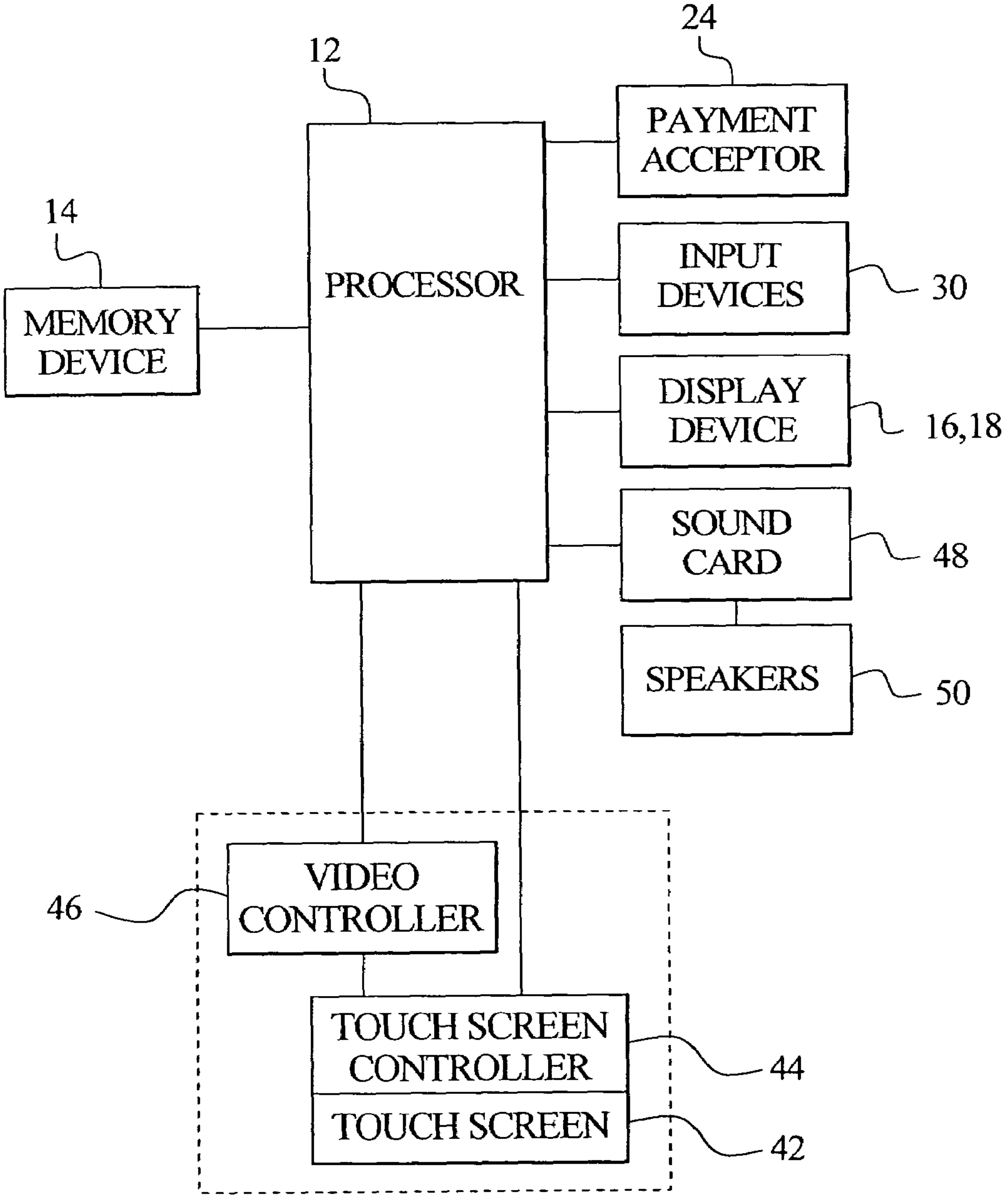
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like. In one embodiment described below, the display device displays a plurality of value indicators which include graphical representations of integer-by-integer numerical increases.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound-generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Gaming device 10 can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented into the present invention.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device displays at least one and preferably a plurality of reels 54, such as three to five reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, the plurality of simulated video reels 54 are displayed on one or more of the display devices as described above. Each reel 54 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning pattern.

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and replacement cards are dealt from the remaining cards in the deck. This results in a final five-card hand. The final five-card hand is compared to a payout table which utilizes conventional poker hand rankings to determine the winning hands. The player is provided with an award based on a winning hand and the credits the player wagered.

In another embodiment, the base or primary game may be a multi-hand version of video poker. In this embodiment, the player is dealt at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

Figure 2B:
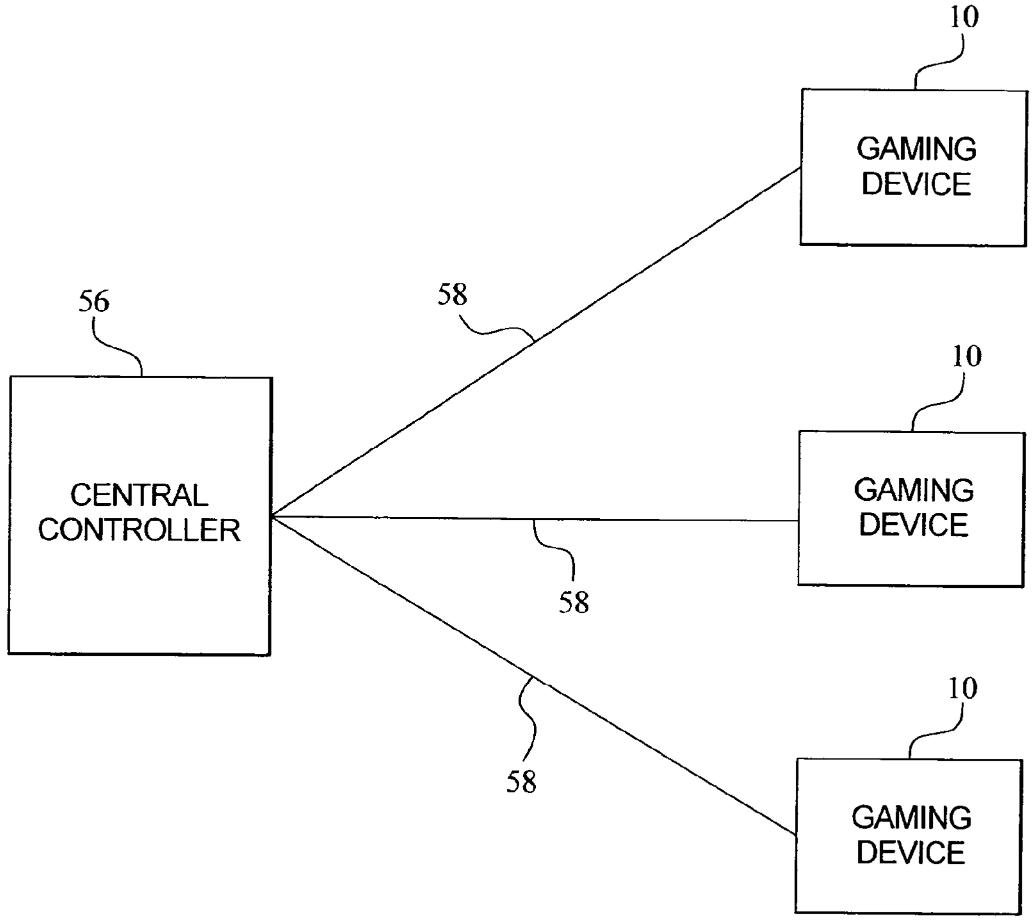
FIG. 2B is a schematic block diagram illustrating a plurality of gaming terminals in communication with a central controller.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Game with Incremental Value Disclosure

Figure 3:
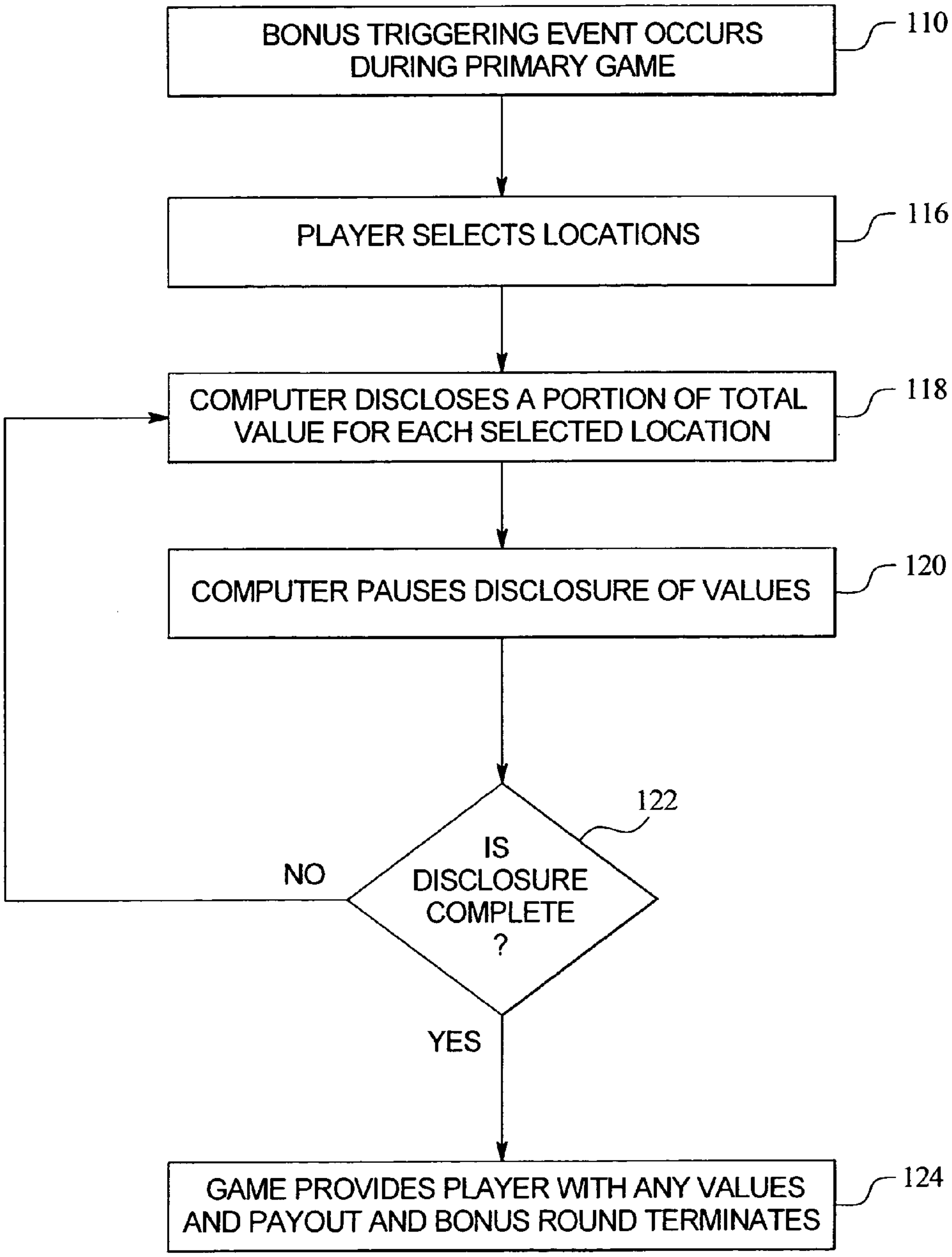
FIG. 3 is a flow diagram of the operation of one embodiment a bonus game in the present invention.

Referring now to FIGS. 3 through 12, in one embodiment, the game of the present invention begins when a triggering event occurs during the primary game of the gaming device 10, as indicated by block 110 in FIG. 3. Once the bonus round begins, the gaming device enables the player to select one or more locations 112 from at least one and preferably a plurality of locations 112. A player preferably selects a location 112 by touching touch screen 42 (shown in FIG. 2A) at a position adjacent to a location 112. However, a player can use play button 34 (shown in FIGS. 1A and 1B) or any other suitable activator to select a location 112.

Which locations 112 a player can select is either predetermined or determined by the computer during the primary game or bonus round. Locations 112 can be arranged in any orderly or disorderly fashion, connected to one another, disconnected from one another and of any size, shape or color. Locations 112 are shown in FIG. 4 as squares merely for illustrative purposes.

One or more of the locations 112 is associated with a total value. Preferably, each location 112 is associated with one total value. The total value, which can be zero or any positive or negative number such as positive fifty or negative one hundred, preferably varies from location to location; however, it should be appreciated that one or more locations 112 can have the same total value. The total value is predetermined and programmed into the computer or generated by the computer during the primary game or bonus round.

Figure 4:
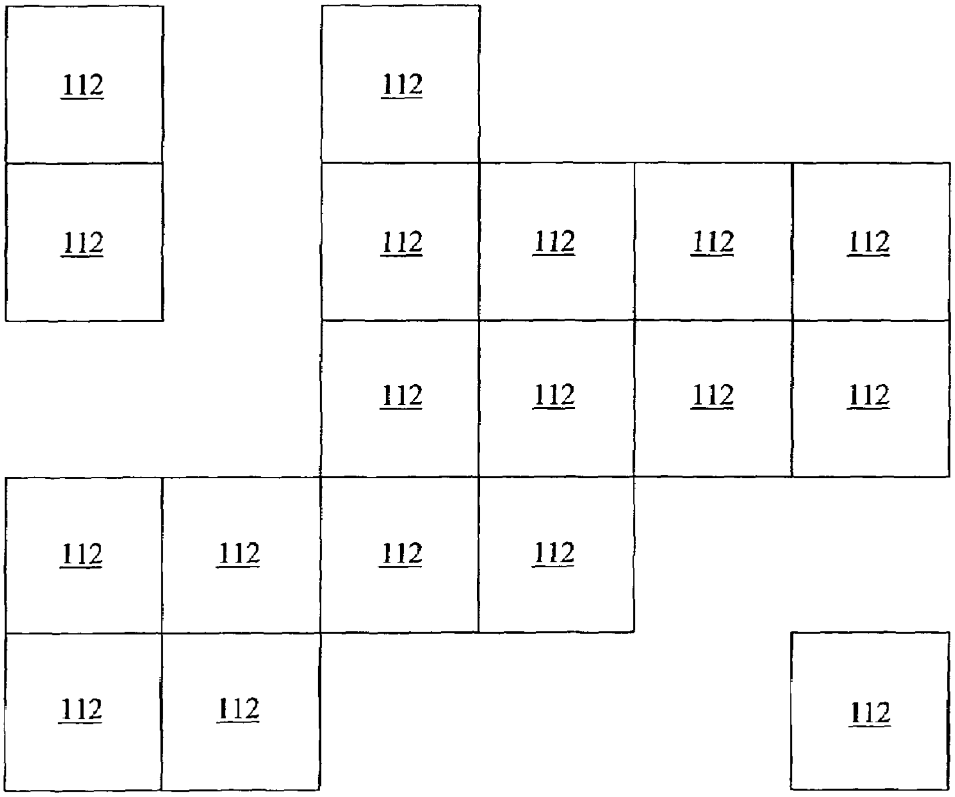
FIG. 4 is a top plan view of the locations in one embodiment of the bonus scheme of the present invention.
Figure 5:
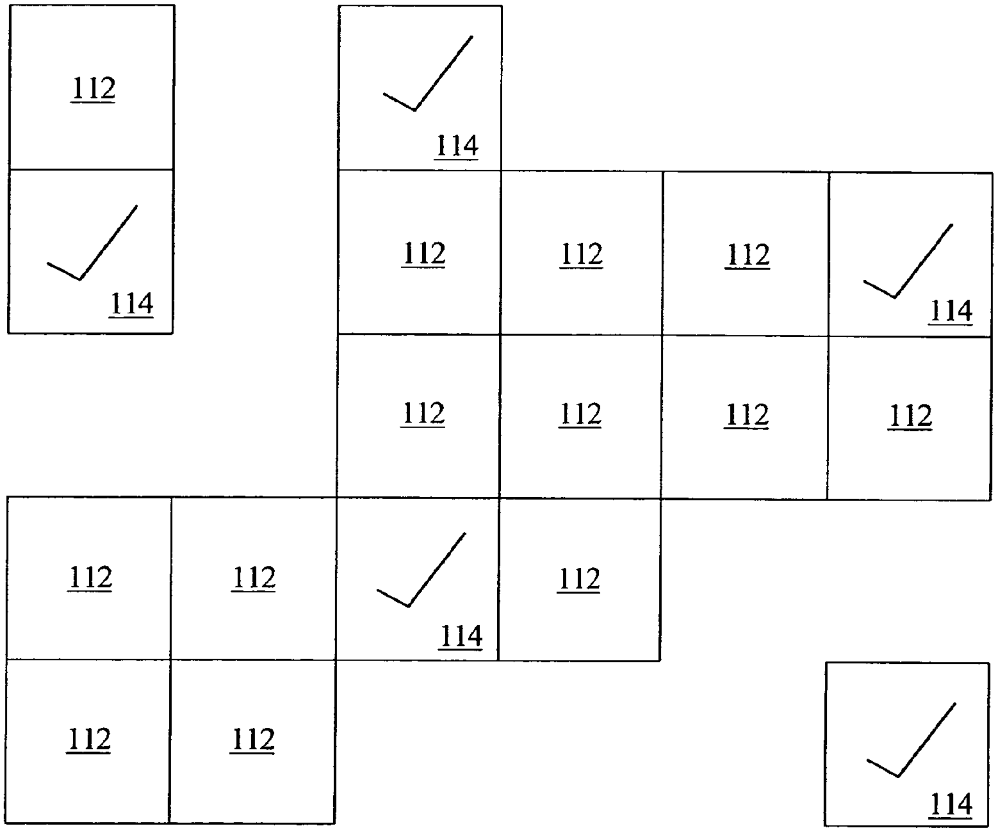
FIG. 5 is a top plan view of the locations and selected locations in a bonus game in one embodiment of the present invention.

In the example bonus round shown in FIGS. 4 and 5, the gaming device enables the player to select five out of eighteen locations 112. The selected locations 114 are indicated in FIG. 5 with a selection indicator, though they can be indicated in any other suitable manner. After the player makes the selections, the game discloses the total values in increments.

Referring back to FIG. 3, after the player chooses the predetermined number of selected locations 114 as indicated by block 116, the gaming device discloses a portion of the total value associated with each selected location 114, as indicated by block 118. The gaming device preferably conducts this disclosure simultaneously for all selected locations 114 after the player makes his or her final selection. However, the present invention can be adapted to make the disclosure for each selected location 114, individually, after the player makes his or her final selection. In this alternative, the gaming device can complete a disclosure for each selected location 114 before conducting a disclosure on the next selected location 114, or the gaming device can start a disclosure with one selected location 114 and before completing this disclosure start other disclosures with other selected locations 114. The gaming device could then return to various selected locations 114 in any fashion or pattern to complete the disclosures. In another alternative, the gaming device can make the disclosure following each selection the player makes.

In either alternative, after the gaming device makes the disclosure the gaming device stops or pauses any further disclosure for a predetermined, limited amount of time, as indicated by block 120. This limited amount of time is preferably in the range of one to five seconds; however, any other relatively short amount of time is suitable. Preferably, during the pause the game performs certain exhibitions, for instance including images, graphics, sounds or animations to generate anticipation, entertainment or excitement. After the pause ends, if the entire disclosure of total values for all of the selected locations 114 is complete, the computer adds the total values (whether positive or negative) to the player's existing balance of values. The gaming device then provides the player with any payout due to the player, followed by termination of the bonus round, as indicated by diamond 122 and block 124. However, if the disclosure is not complete at this point, the gaming device makes an additional disclosure of an additional portion of the total value for each selected location 114. The gaming device then pauses this disclosure again, and this process repeats itself until the entire disclosure is complete, until a predetermined amount of time elapses or until some other predetermined event occurs.

Figure 6:
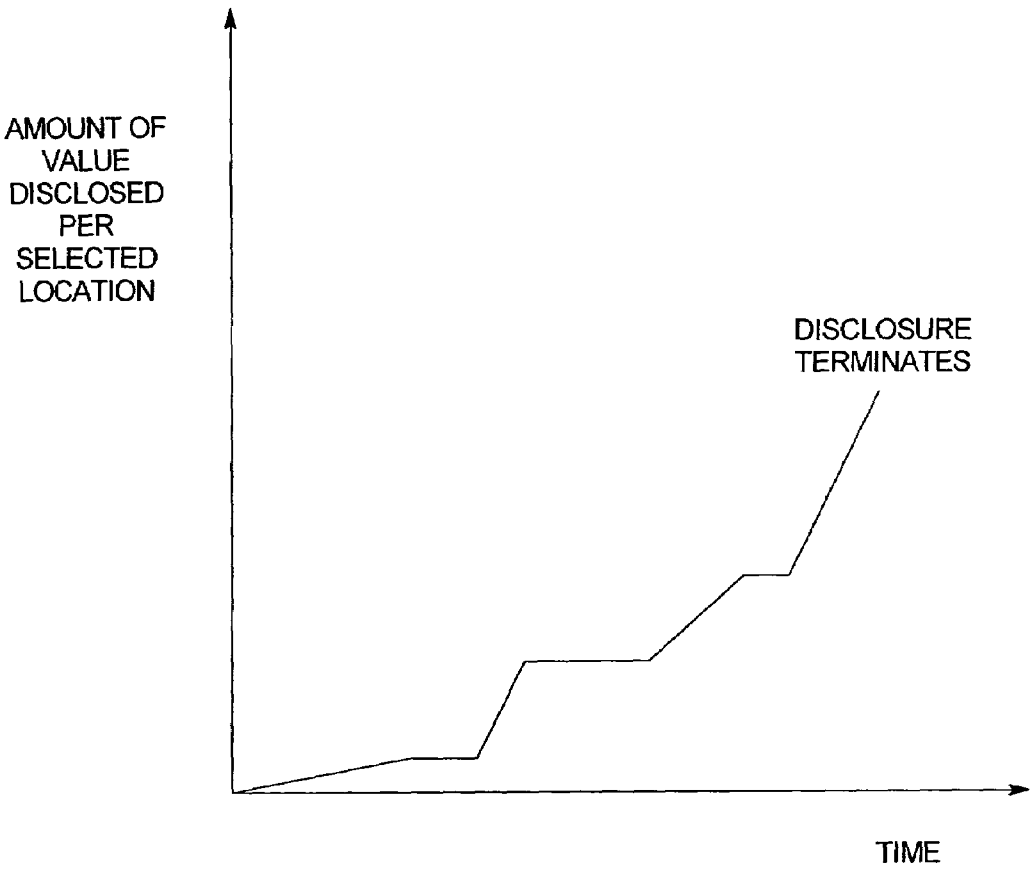
FIG. 6 is a graph diagram of the incremental value disclosure in a bonus game in one embodiment of the present invention.

The incremental disclosure of the present invention is generally illustrated in the graph shown in FIG. 6. The amount of the value disclosed for a single selected location 114 is plotted along the y-axis. Time is plotted along the x-axis. The curve plotted on this graph represents four separate disclosures where the gaming device discloses a portion of the total value over a certain amount of time. The four non-horizontal lines represent the disclosures. The amount of disclosure over time can vary from partial disclosure to partial disclosure, as illustrated by the varying slopes of the non-horizontal lines in FIG. 6.

The pauses which occur in between the partial disclosures are also illustrated in FIG. 6. These pauses are illustrated as horizontal lines with varying lengths. The varying lengths of the horizontal lines illustrate that the durations of the different pauses can vary.

Figure 7:
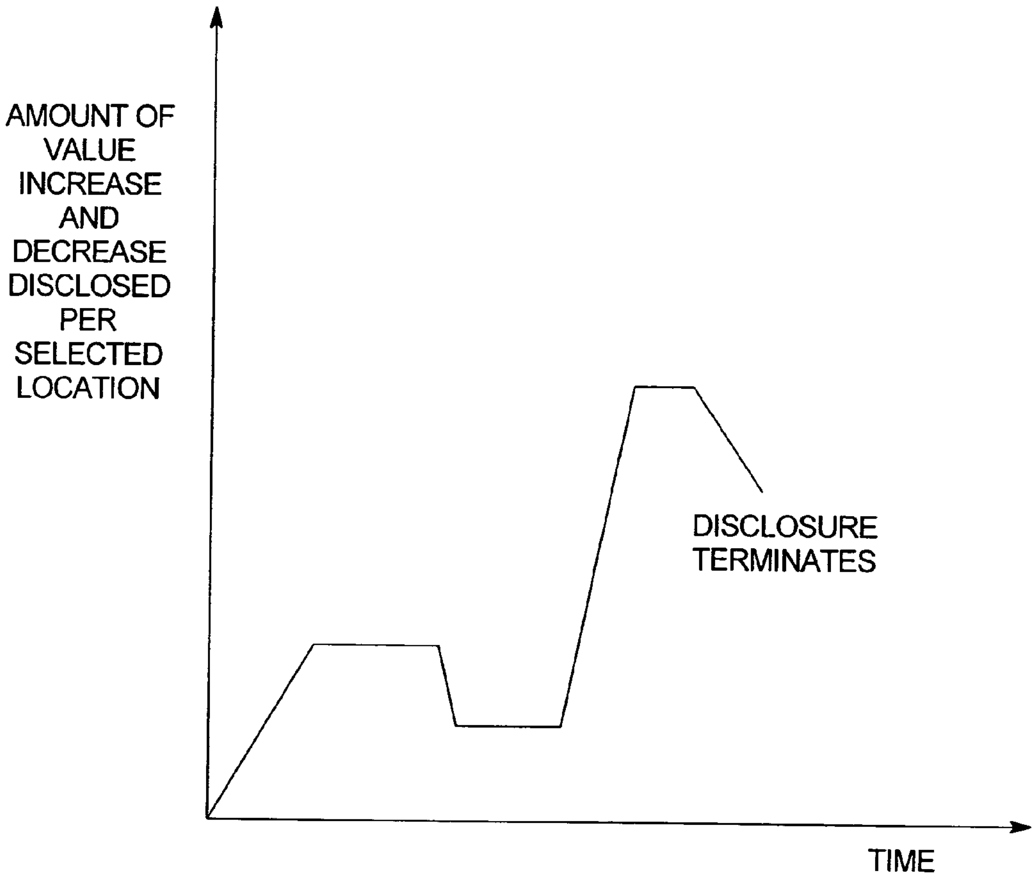
FIG. 7 is a graph diagram of the incremental value increase and decrease disclosure in a bonus game in one embodiment of the present invention.
Figure 8:
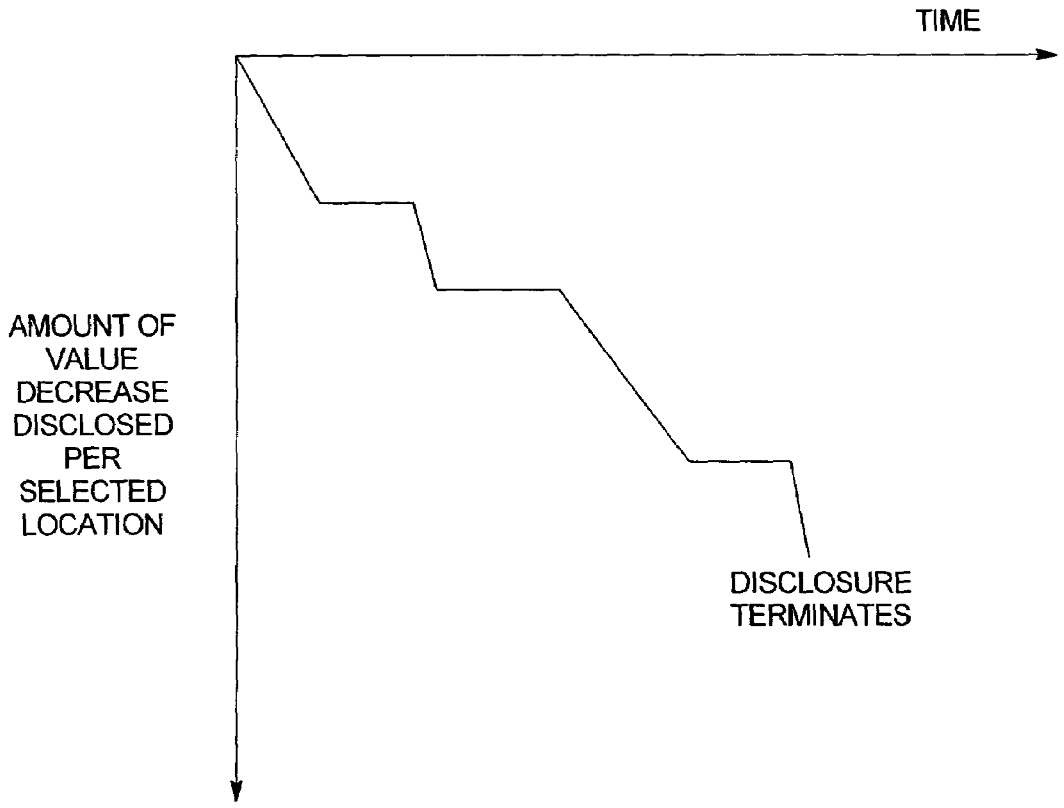
FIG. 8 is a graph diagram of the incremental value decrease disclosure in a bonus game in one embodiment of the present invention.

A total value for a location 114 can be negative in a variety of scenarios. For example, after the player makes the selections, the gaming device can alternatively disclose value increases and decreases in a plurality of increments (i.e., positive one hundred in the first partial disclosure and negative one hundred and fifty in the second partial disclosure), as illustrated in FIG. 7. In another example, a player could reach a penalty screen in a bonus round where the gaming device decreases a player's entire balance of values. Here, the gaming device discloses only decreases in values, as illustrated in FIG. 8.

The gaming device of the present invention can be adapted to disclose values to players in a variety of manners. The gaming device can display partial disclosures in a meter or other value window. For example, before the player makes the selections, the value window may display zero. After the player makes the selections and the incremental disclosure begins, the value window can display the various portions of the total value in a variety of scenarios (i.e., positive ten, then positive forty, then positive one hundred, then positive three hundred; or negative ten, then negative forty, then negative one hundred, then negative three hundred; or positive ten, then negative ten, then positive forty, then negative two hundred, then positive eighty). In all of these examples, the total value is the sum of the partial disclosures. Preferably, during the pause in between each partial disclosure, the value window displays a non-changing balance of values or sum of the partial disclosures. When disclosure resumes, the value window displays an increasing or decreasing value, in accordance with the nature of the disclosure. It should be appreciated that if a total disclosure is zero after a selection, the gaming device can immediately display the zero value or first display various numerals and then display the zero value.

The gaming device of the present invention enables gaming devices to disclose values to players in increments. The gaming device discloses a portion of a total value, followed by a pause, and this process repeats itself until the gaming device discloses the total value. This incremental value disclosure concept effectively increases a player's anticipation, engagement and excitement when the gaming device provides or takes away values.

Figure 9:
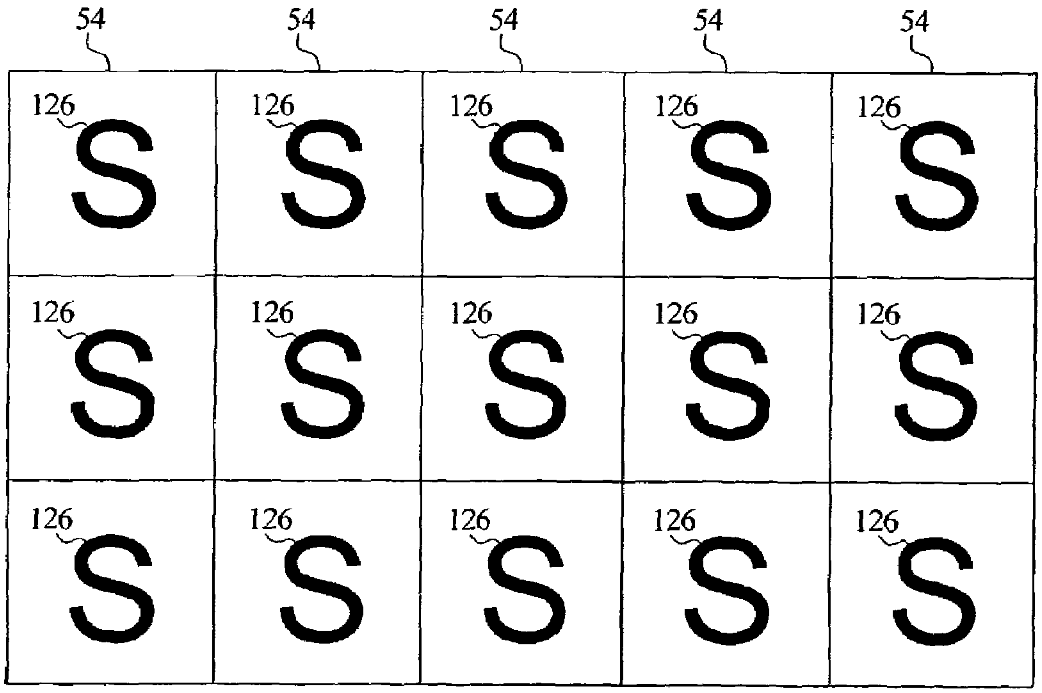
FIG. 9 is a top plan view of the reels and symbols in a primary game in one embodiment of the present invention.

In one gaming device embodiment of the present invention shown in FIGS. 9 through 12, the triggering event involves a plurality of reels 54 and a plurality of symbols 126 in a primary game. The symbols are indicated in FIG. 9 with an "S." The triggering event is a predetermined symbol 126 or combination of symbols 126 displayed on the reels 54. Preferably, the triggering event is three or more predetermined, identical triggering symbols 128 displayed on adjacent reels 54.

Figure 10:
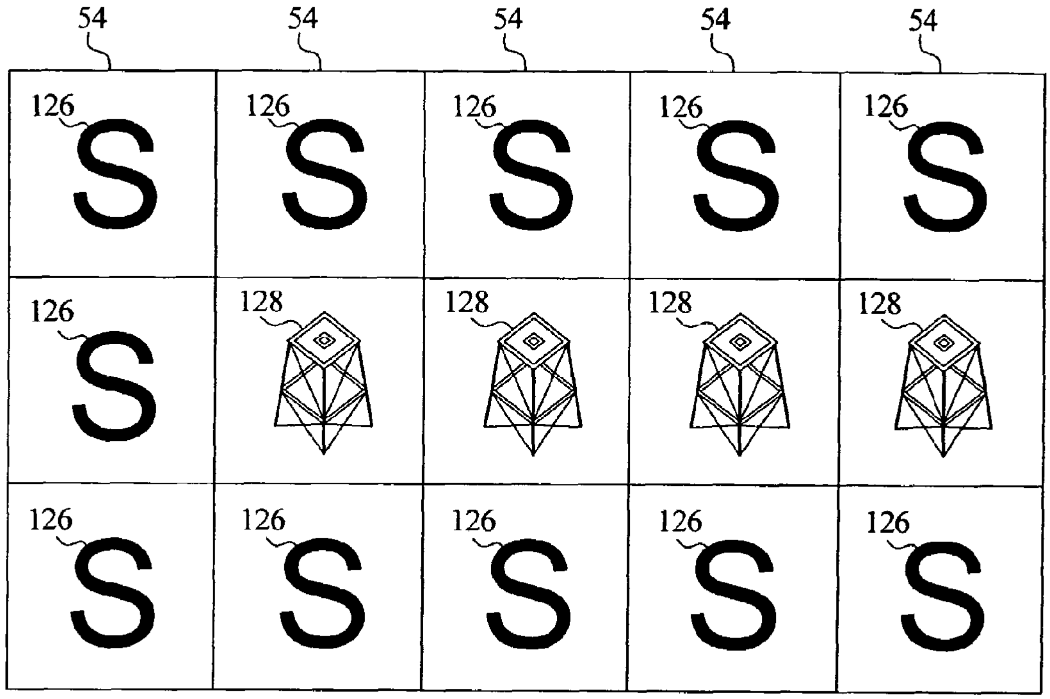
FIG. 10 is a top plan view of the reels, symbols and indicators in a primary game in one embodiment of the present invention.
Figure 11:
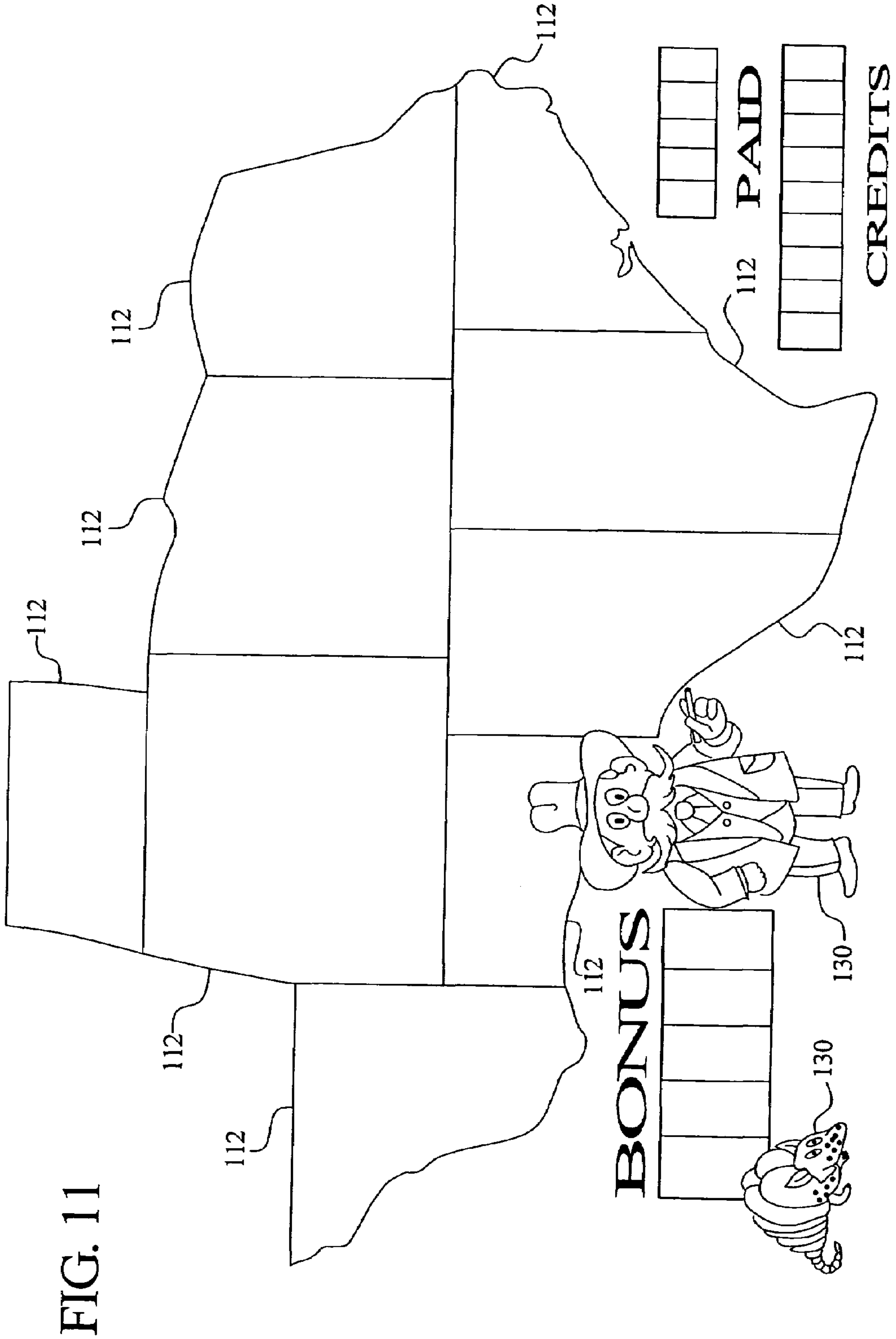
FIG. 11 is a top plan view of the locations in a bonus game in one embodiment of the present invention.

As shown in FIG. 10, these triggering symbols 128 are oil derricks in one example. In this example bonus round, the player reaches four adjacent triggering symbols 128, and the computer initiates the bonus round of the present invention. Next, the gaming device displays the bonus screen shown in FIG. 11.

The first bonus screen displays a plurality of locations 112 which are connected in the shape of the state of Texas, United States. This bonus screen also includes one or more characters 130. The human character 130 informs the player that it is time for the player to make his or her selections of the locations 112.

The gaming device then enables the player to select a certain number of locations 112. The number of triggering symbols 128 which established the triggering event equals the number of locations 112 which a player can select. In this example, the triggering event included four triggering symbols 128 (shown in FIG. 10). Therefore, the gaming device enables the player to choose four locations 112.

Figure 12:
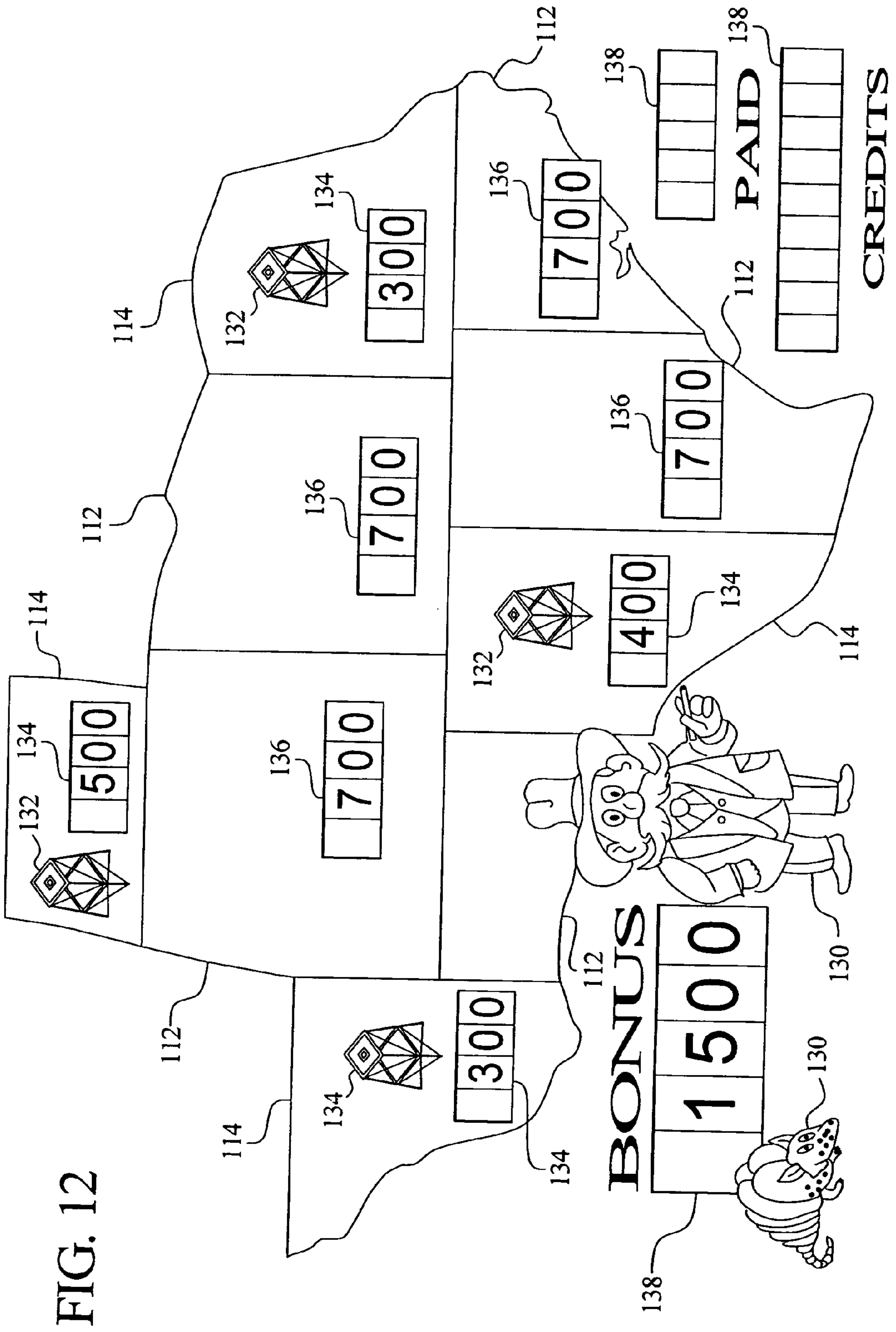
FIG. 12 is a top plan view of the locations, indicators, value meters, characters and windows in a bonus game in one embodiment of the present invention.
Figure 13:
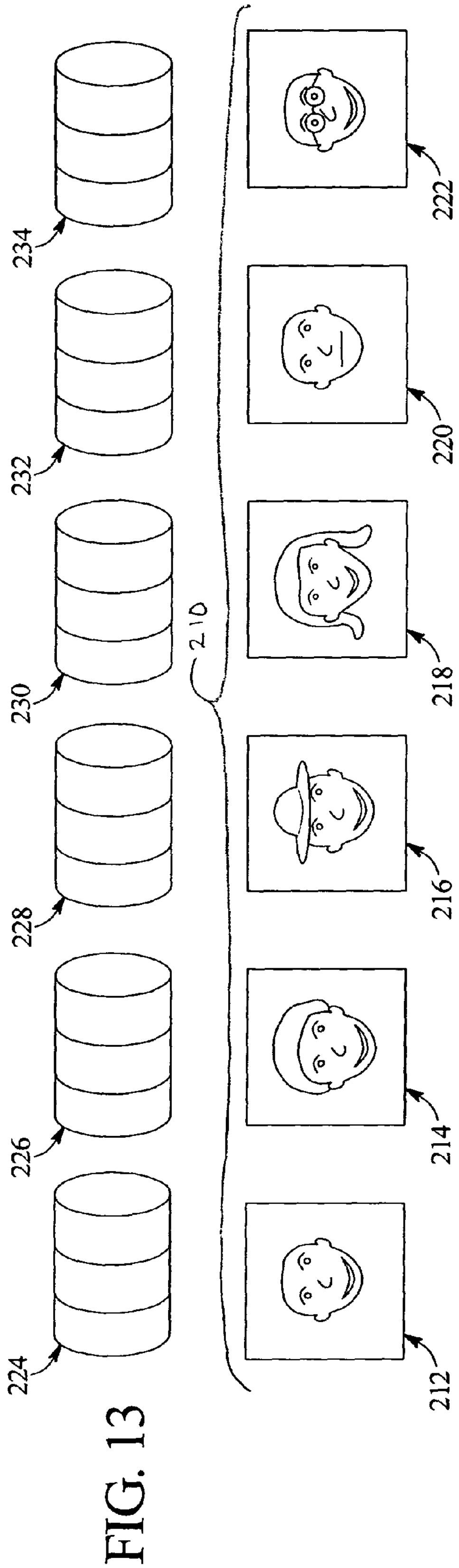
FIG. 13 is a top plan view of the symbols and value indicators in one example of a game in one embodiment of the present invention.

As shown in FIG. 12, when a player selects a location 112, the gaming device displays an indicator 132 at the selected location 114. In this preferred embodiment, the indicator 132 is an oil derrick. Also, the gaming device colors, shades or illuminates the selected locations 114 to distinguish them from the non-selected locations 112. Furthermore, one value meter 134 is displayed adjacent to each of the selected locations 114.

In this example bonus round, after receiving the prompt from the human character 130, the gaming device enables the player to select four locations. After the player makes the four selections shown in FIG. 12, the gaming device then discloses in increments the total value for the selected locations 114. The value meters 134 display a numeric value which gradually increases after each partial disclosure and remains unchanged during the pauses in between each partial disclosure. For example, the value meter 134 initially displays no value, and during the first partial disclosure the value meter 134 rolls the numerals one through one hundred. During the pause, the value meter 134 displays the non-changing number one hundred, and during the next partial disclosure the value meter 134 rolls the numerals one hundred through three hundred.

Also, in between each partial disclosure, a character 130 audibly informs the player of the values accumulated by the player thus far in the bonus round. The character 130 also audibly informs the player that the game will provide additional disclosure. When the disclosure in complete, the gaming device displays one reveal meter 136 adjacent to each of the non-selected locations 112. These reveal meters 136 reveal the total value which the gaming device would have provided to the player had the player chosen the non-selected locations 112.

In addition, when the gaming device displays these total values, the gaming device applies a single shade or color to the non-selected locations 112. Finally, the gaming device animates a celebration carried out by the characters 130. This embodiment also includes various windows 138 which inform the player about the player's accumulated bonus values, credits and other payout due to the player. In this example, the location 112, indicators 132, characters 130 and all other images and sounds of the present invention are related to the theme of oil business in Texas, United States.

First Alrernative Embodiment

Referring now to FIGS. 13 through 22, in one embodiment the gaming device includes a primary game or secondary game which includes: (a) a plurality or group 210 of symbols 212 through 222; (b) a plurality of value indicators 224 through 234 associated with the symbols 212 through 222; (c) a first phase of selection opportunities 236*a* through 236*c*; and (d) a second selection opportunity 238.

The symbols 212 are shown as faces of characters for illustration purposes. It should be appreciated that the symbols 212 can include any suitable symbol, image, location or selection which is selectable by the player. In addition, the value indicators 224 through 234 are shown as rolling meters for illustrative purposes. It should be appreciated that the value indicators 224 through 234 can include any suitable animation, symbol, image or graphical representation which indicates values to the player.

Figure 14A:
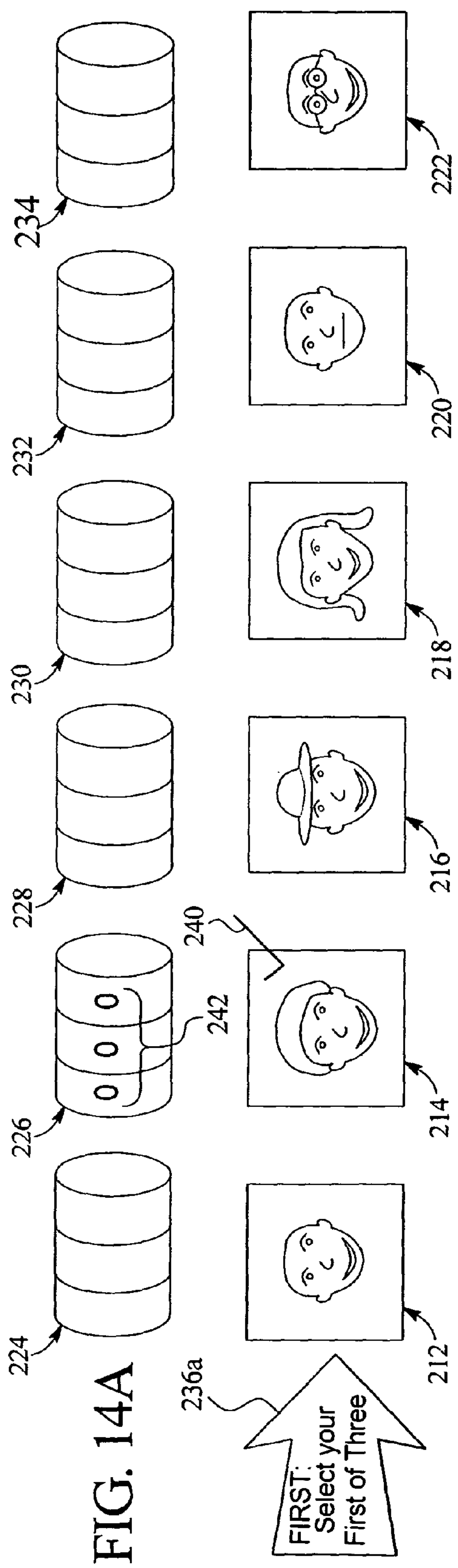
FIG. 14A is a top plan view of the game of FIG. 13 illustrating a player's selection of a first symbol and an indication of the starting value associated with the first symbol in one embodiment of the present invention.
Figure 14B:
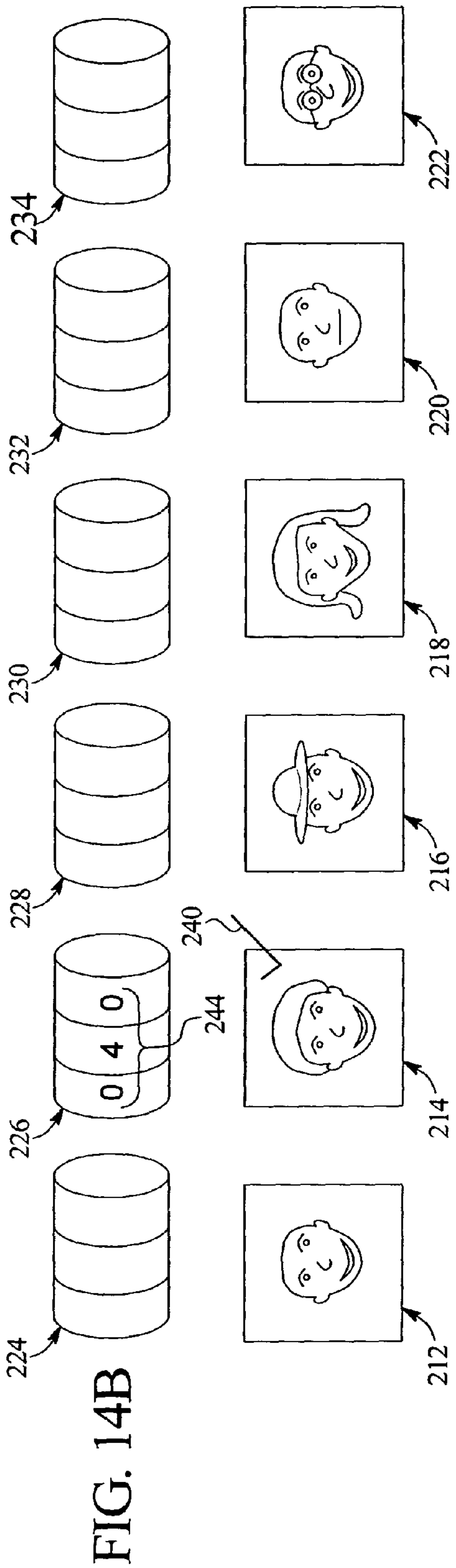
FIG. 14B is a top plan view of the game of FIG. 13 illustrating an indication of the intermediate value associated with the first symbol selected by the player in one embodiment of the present invention.
Figure 14C:
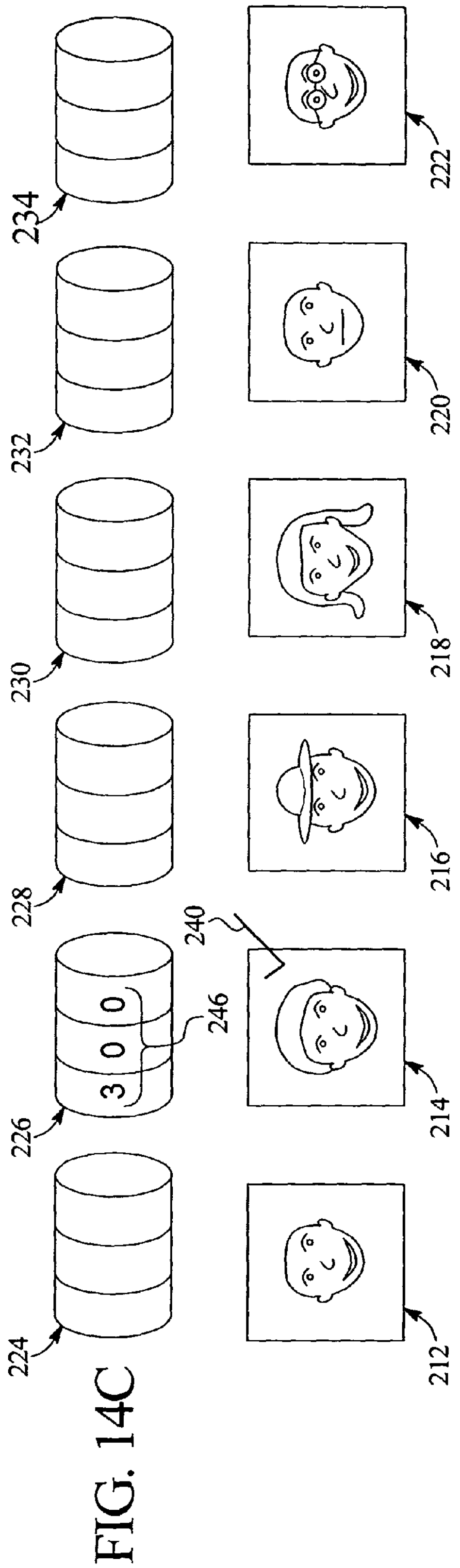
FIG. 14C is a top plan view of the game of FIG. 13 illustrating an indication of the final value associated with the first symbol selected by the player in one embodiment of the present invention.

The first selection opportunity 236*a* that enables the player to select a designated quantity of the symbols 212 through 222. As illustrated in FIG. 14A, the selection opportunity 236*a* initially enables the player to select one of the symbols 212 through 222. Here, the player selects symbol 214 as indicated by selection indicator or checkmark 240. At this point, the gaming device causes the value indicator 226 to indicate a starting value 242 of zero. Next, after a period of time elapses, the gaming device causes the value indicator 226 to indicate an intermediate value 244 of forty as illustrated in FIG. 14B. Finally, as illustrated in FIG. 14C, after another period of time elapses, the gaming device causes the value indicator 226 to indicate the final value 246 of three hundred.

Figure 15A:
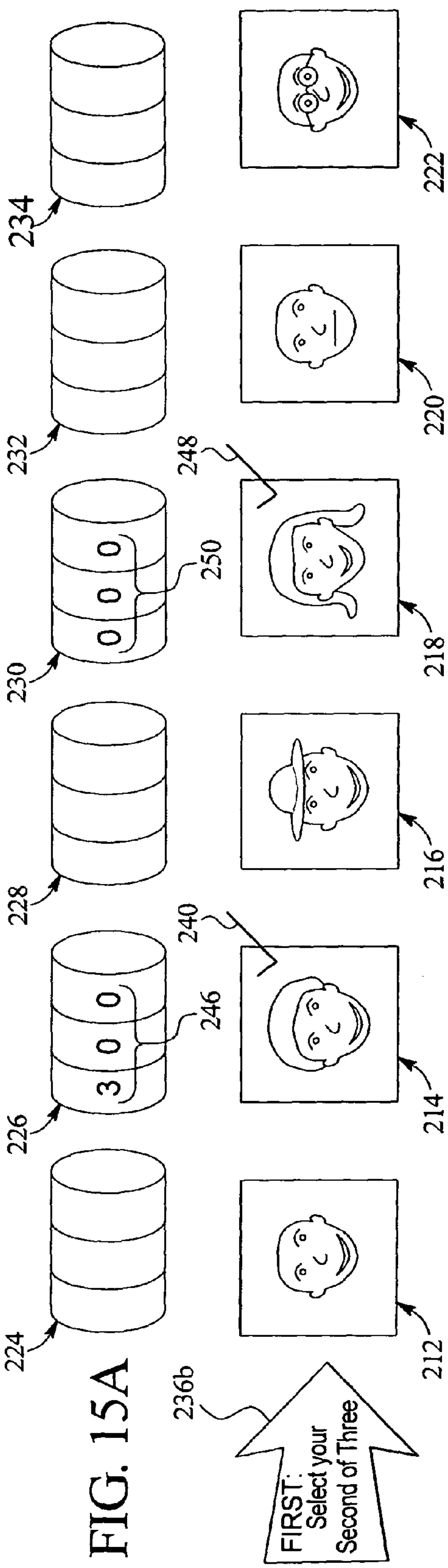
FIG. 15A is a top plan view of the game of FIG. 13 illustrating a player's selection of a second symbol and an indication of the starting value associated with the second symbol in one embodiment of the present invention.
Figure 15B:
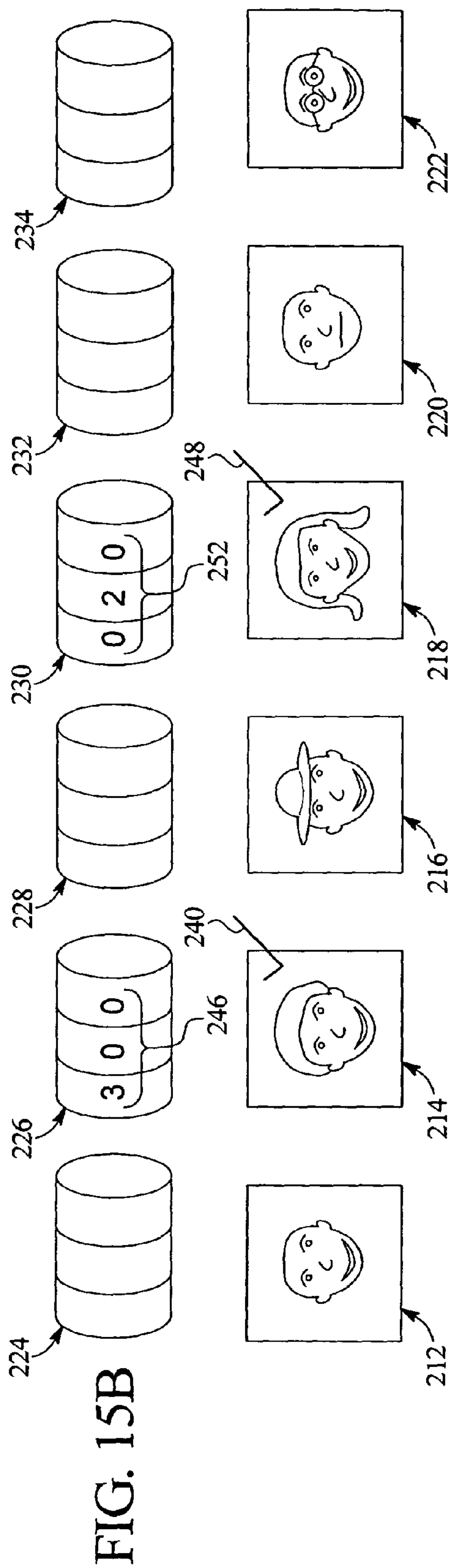
FIG. 15B is a top plan view of the game of FIG. 13 illustrating an indication of the intermediate value associated with the second symbol selected by the player in one embodiment of the present invention.
Figure 15C:
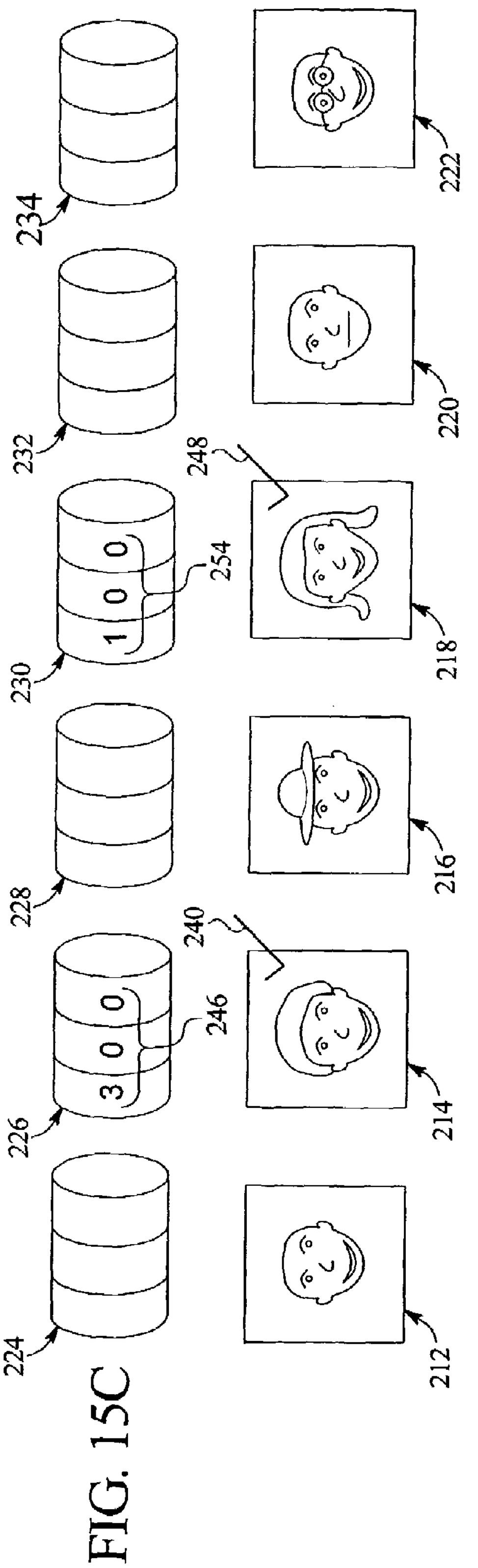
FIG. 15C is a top plan view of the game of FIG. 13 illustrating an indication of the final value associated with the second symbol selected by the player in one embodiment of the present invention.

As illustrated in FIG. 15A, the selection opportunity 236*b* now enables the player to select a second one of the symbols 212 through 222. Here, the player selects the symbol 218 as illustrated by the selection indicator or checkmark 248. Next, the gaming device causes the value indicator 230 to indicate a starting value 250 of zero. As illustrated in FIG. 15B, after a period of time elapses, the gaming device causes the value indicator 230 to indicate an intermediate value 252 of twenty. As illustrated in FIG. 15C, after another period of time elapses, the gaming device causes the value indicator 230 to indicate a final value 254 of one hundred.

Figure 16A:
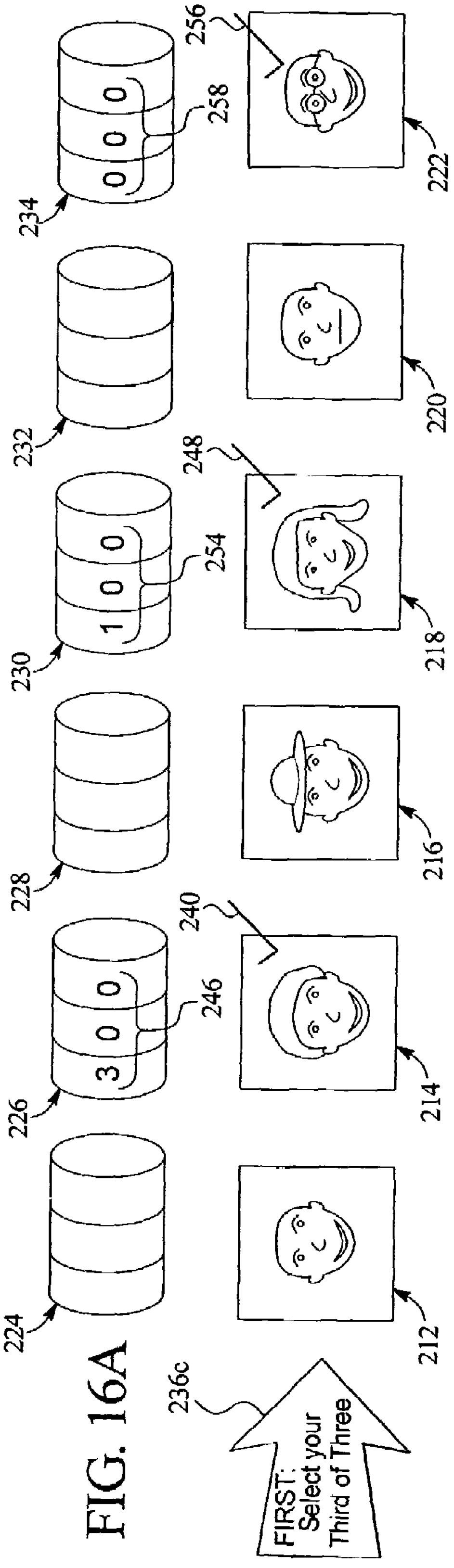
FIG. 16A is a top plan view of the game of FIG. 13 illustrating a player's selection of a third symbol and an indication of the starting value associated with the third symbol in one embodiment of the present invention.
Figure 16B:
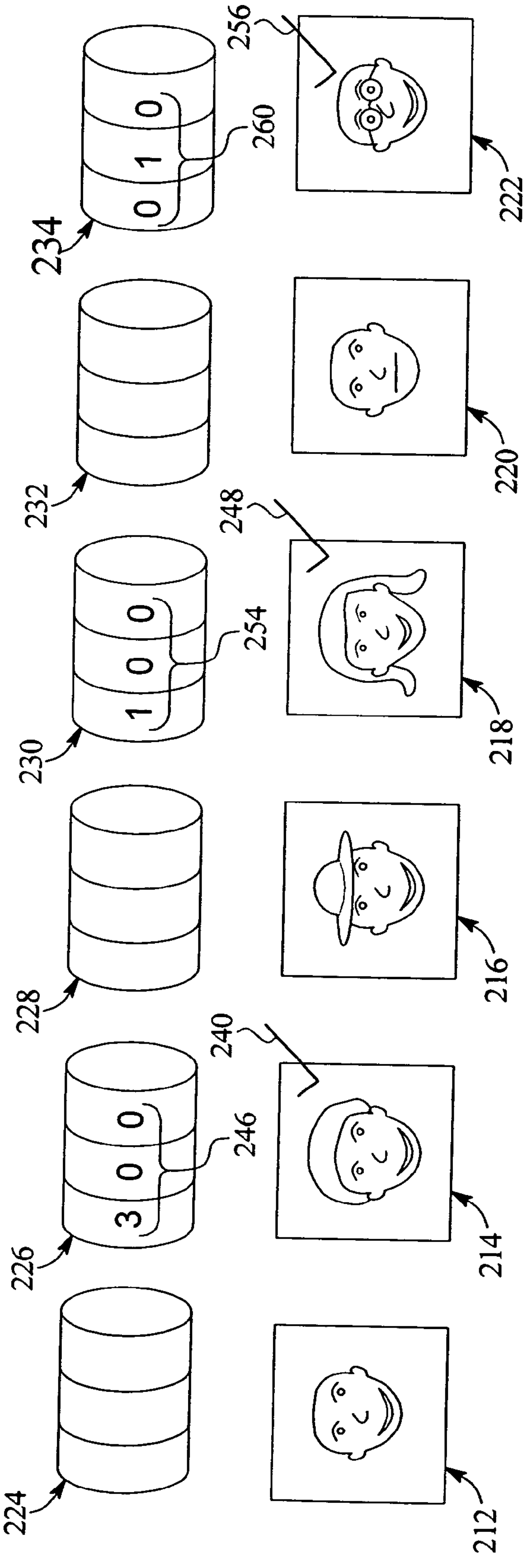
FIG. 16B is a top plan view of the game of FIG. 13 illustrating an indication of the intermediate value associated with the third symbol selected by the player in one embodiment of the present invention.
Figure 16C:
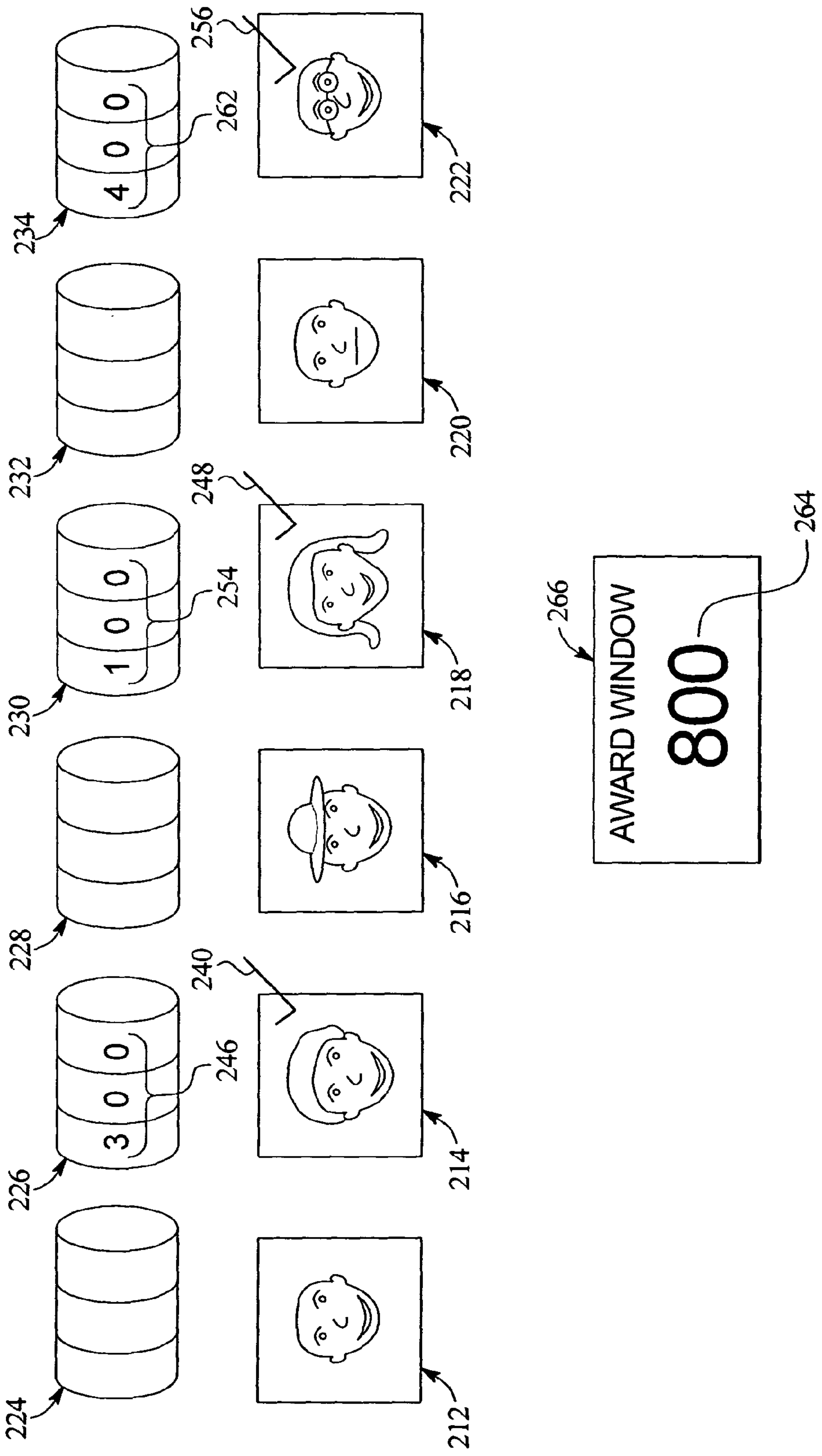
FIG. 16C is a top plan view of the game of FIG. 13 illustrating: (a) an indication of the final value associated with the third symbol selected by the player; and (b) the sum of all of the indicated final values in one embodiment of the present invention.

Referring to FIG. 16A, the selection opportunity 236*c* enables the player to select a third of the symbols 212 through 222. Here, the player selects symbol 222 as indicated by selection indicator 256. Initially, the gaming device causes the value indicator 234 to indicate a starting value 258 of zero. Next, after a period of time elapses, the gaming device causes the value indicator 234 to indicate an intermediate value 260 of ten as illustrated in 16B. Next, after a period of time elapses, the gaming device causes the value indicator 234 to indicate a final value 262 of four hundred as illustrated in FIG. 16C. At this point, the gaming device displays a sum 264 of the final values 246, 254 and 262 in the award window 266. In this example, the sum 264 is eight hundred.

In this embodiment, the gaming device conducts three incremental value disclosures in three different stages. In the first stage, the gaming device incrementally discloses the final value 246 associated with the symbol 214. In the second stage, the gaming device incrementally discloses the final value 254 associated with the selected symbol 218. In the third stage, the gaming device incrementally discloses the final value 262 associated the selected symbol 222.

Figure 17:
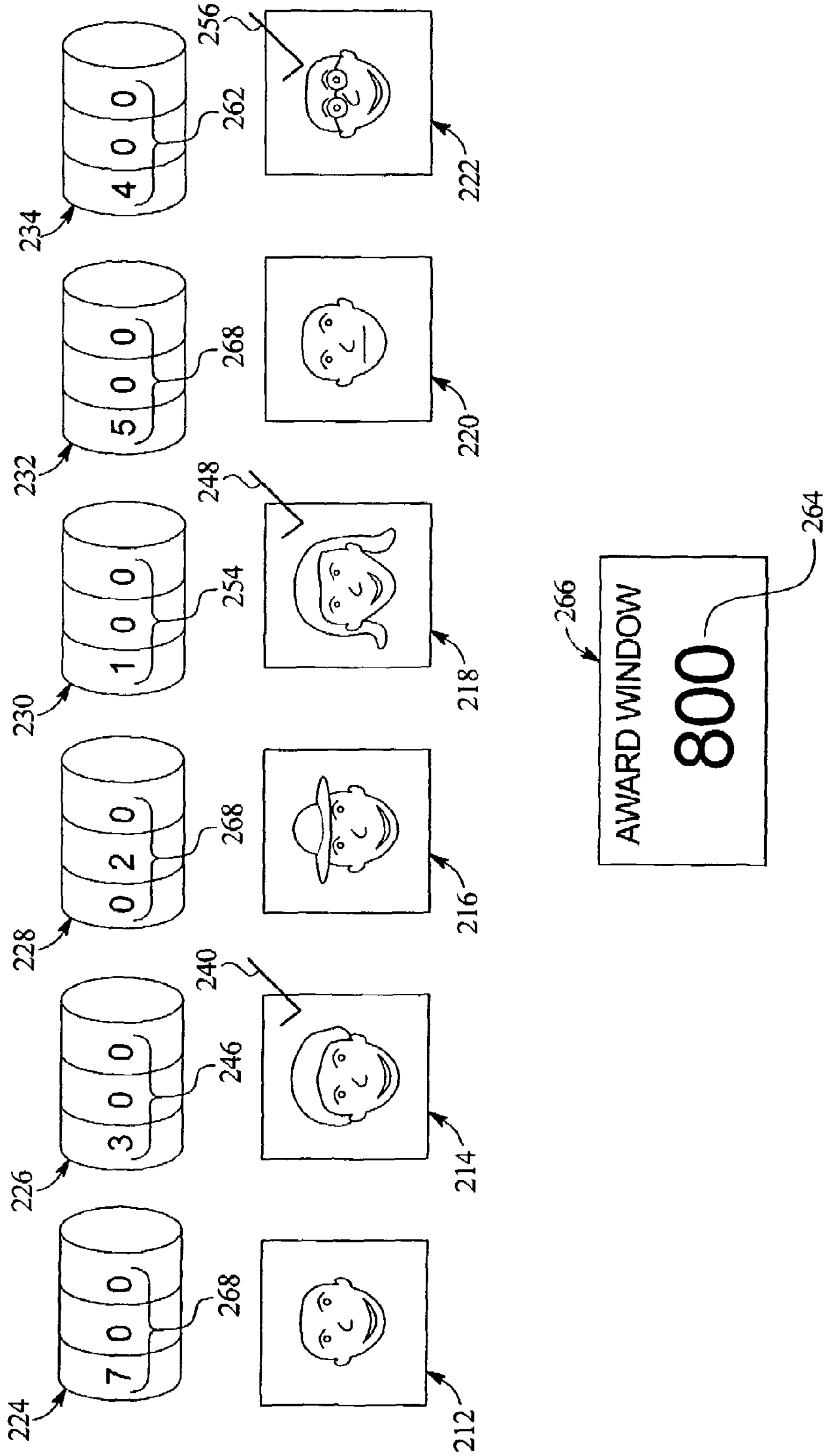
FIG. 17 is a top plan view of the game of FIG. 13 illustrating: (a) the indicated final values associated with all of the selected symbols; (b) the final values associated with the non-selected symbols; and (c) the sum of the final values associated with the selected symbols in one embodiment of the present invention.
Figure 18:
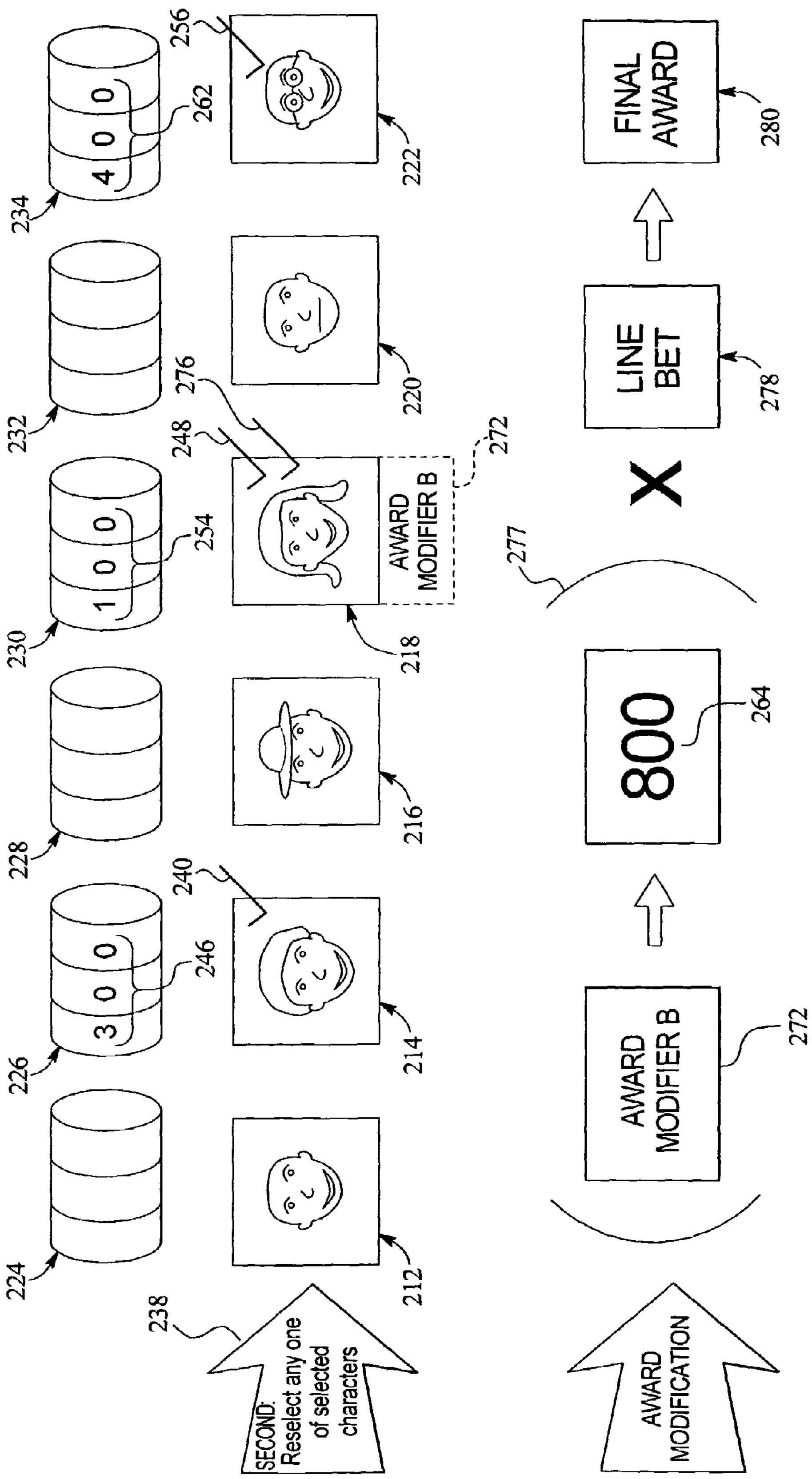
FIG. 18 is a top plan view of the game of FIG. 13 illustrating: (a) the player's reselection of one of the symbols; (b) the mathematical award modifier associated with the reselected symbol; and (c) the award modification process in one embodiment of the present invention.

As illustrated in FIG. 17, in one embodiment, after the gaming device displays or indicates the final values 246, 254 and 262, the gaming device reveals the potential final values 268 which would have been available to the player had the player chosen symbols 212, 216 and 220. For example, if the player had selected these symbols 212, 216 and 220, the gaming device would have indicated the final values 268 which amount to a sum of one thousand two hundred twenty.

The second selection opportunity 238 of the present invention enables the player to reselect one or more of the symbols 214, 218 or 222. In this embodiment, each of the selected symbols 214, 218 and 222 is associated with one or more award modifiers 270, 272 and 274, respectively, as illustrated in FIG. 19. An award modifier can include any mathematical modification, variation or mulpulation of the sum 264 or one or more of the final values 246, 254 and 262. In the examples illustrated in FIG. 19, the award modifier 270 can be a consolation prize in the amount of fifty credit units, award modifier 272 can be a multiplication factor of two, and the award modifier 274 can be a multiplication factor of four. Referring back to FIG. 18, in this example, the player reselects the symbol 218 as indicated by the selection indicator or checkmark 276. Next, the gaming device performs a mathematical calculation by applying the award modifier 272 to the sum 264.

In one embodiment, the gaming device displays the symbols 212 through 222 and value indicators 224 to 234 to the player after the player has reached a bonus triggering event while playing a primary game which enables the player to make a bet on a payline. In this embodiment, it is preferable that the gaming device applies the result 277 of its mathematical calculation to the particular quantity of credits which the player waged for a line bet 278 in the primary game. The gaming device then provides the product of these amounts to the player in the form of a final award 280. In this example, the final award is three thousand two hundred credit units calculated as follows: (2×800)×(2)=3,200, where the line bet was two credit units.

Figure 20:
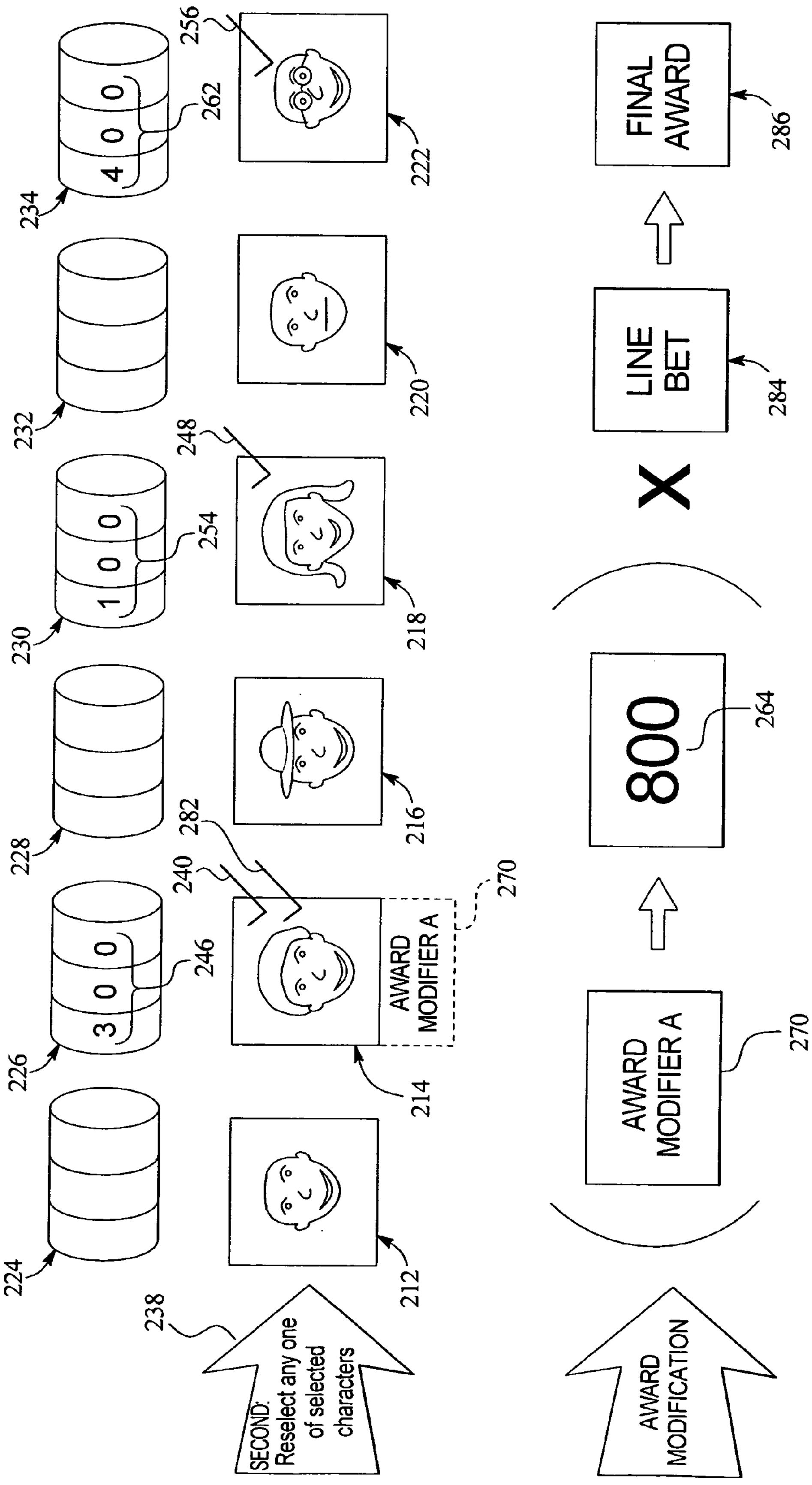
FIG. 20 is a top plan view of the game of FIG. 13 illustrating: (a) the player's reselection of a different one of the symbols; (b) the mathematical award modifier associated with the reselected symbol; and (c) the award modification process in one embodiment of the present invention.

In a different example illustrated in FIG. 20, the player reselects the symbol 214 as indicated by the selection indicator or checkmark 282. Here, the symbol 214 is associated with award modifier 272. In this example, the player's line bet 284 is three credit units. Accordingly, the final award 286 which the gaming device provides to the player is calculated as follows: (50+800)×(3)=2,550.

Figure 21:
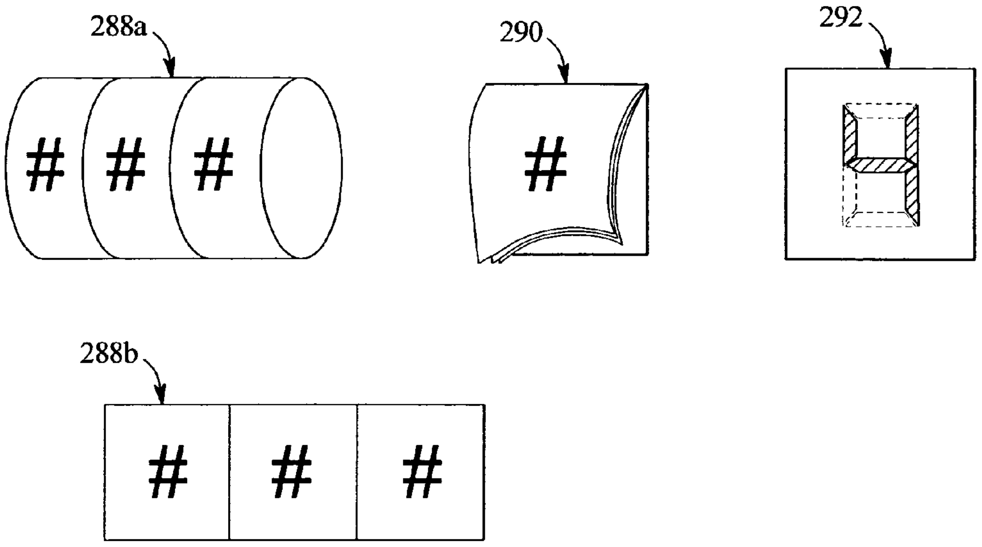
FIG. 21 is a front elevation view of a plurality of different value indicators in one embodiment of the present invention.
Figure 22:
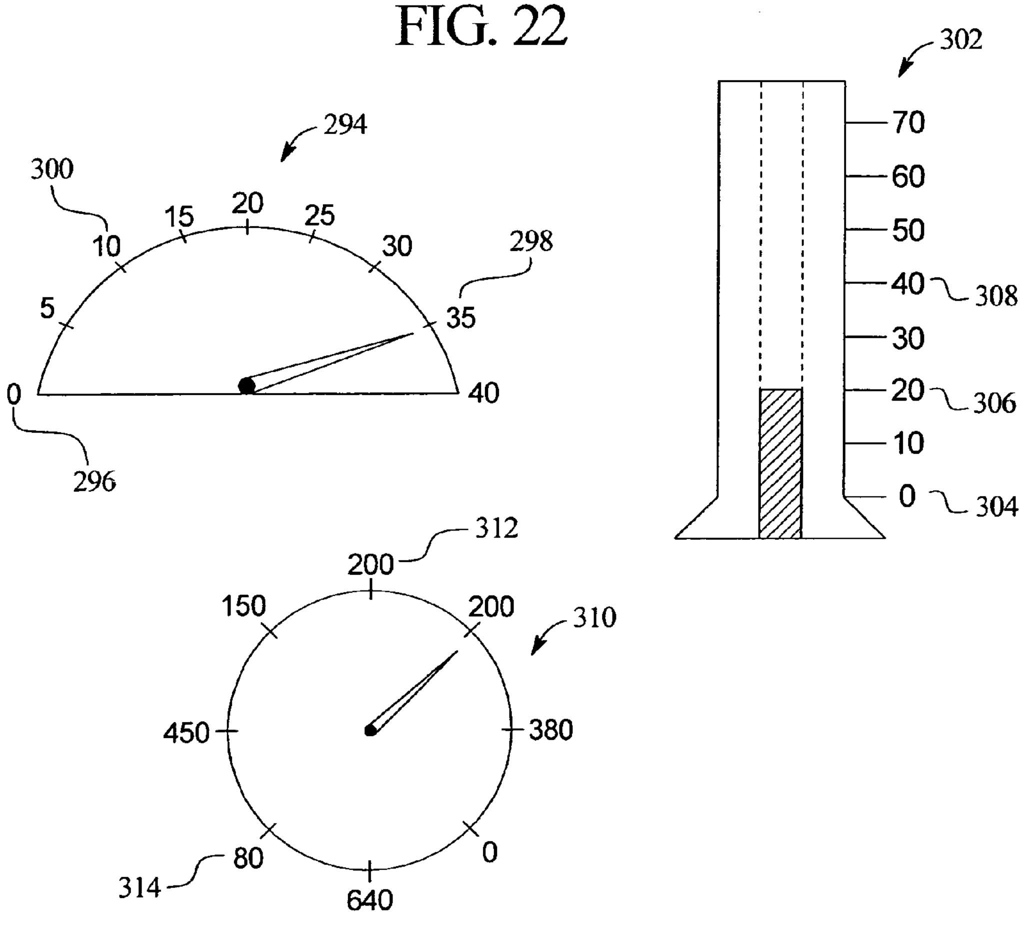
FIG. 22 is a front elevation view of a plurality of different value indicators in a different embodiment of the present invention.

In the embodiment described above with respect to FIGS. 13 through 20, the value indicators preferably do not initially display or otherwise indicate the final values to the player before the player makes an initial selection. This helps maintain a level of excitement for the player. Accordingly, the player is preferably unaware of the final values until the gaming device makes a plurality of integer-by-integer numerical changes using the value indicators. In this embodiment, various suitable value indicators can be used. For example, as illustrated in FIG. 21, this embodiment can include a value indicator 288*a* or 288*b* which resembles, depicts or graphically represents a rolling meter. In another example, this embodiment can include a value indicator 290 which resembles, depicts or otherwise graphically represents a plurality of overlapping sheets. In another example, this embodiment can include a value indicator 292 which resembles, depicts, graphically represents or comprises a digital display which displays or indicates digits or integers.

In another embodiment, the value indicators of the present invention can be adapted to display or otherwise indicate the final value to the player before the player makes an initial selection of the symbols. In this embodiment, the value indicator can include an array or set of values and an indicator, such as a pointer, which moves relative to the values. For example, this embodiment can include the value indicator 294. In this example, the starting value 296 is zero, the intermediate value 298 is thirty five and the final value 300 is ten. In another example, this embodiment can include value indicator 302. Here, the starting value 304 is zero, the intermediate value 306 is twenty and the final value 308 is forty. This embodiment can also include a value indicator 310. In this example, the starting value 312 is two hundred, the intermediate value 314 is eighty and the final value 316 is sixty.

The value indicators of the present invention can include wheels, disks, dials, meters and other suitable indicators. It should be appreciated that, although in many of the examples described above the gaming device only displays only one intermediate value to the player, the gaming device can, and preferably does, display or indicate a plurality of intermediate values (separated by pauses) between the starting value and the final value.

Second Alternative Embodiment

In another embodiment, the gaming device includes a game having: (a) a group of symbols; (b) a value indicator displayed in association with each of the symbols; (c) a set of starting values, a set of intermediate values and a set of final values; and (d) at least one accept/decline opportunity associated with each of the symbols.

In operation, the gaming device enables the player to select one of the symbols in the group. In one embodiment, the gaming device, on an integer-by-integer basis, sequentially retrieves and displays: (a) one of the starting values adjacent to the selected symbol; (b) replaces the starting value with one of the intermediate values; and (c) replaces the intermediate value with one of the final values.

Next, the gaming device presents the player with an accept/decline opportunity, enabling the player to make an accept input to accept this final value or a decline input to decline this final value. If the player accepts this final value, the gaming device provides the player with an award based on or equal to the final value.

If the player declines this final value, the gaming device, enables the player to select a different symbol in the group. Then the gaming device, on an integer-by-integer basis, sequentially retrieves and displays: (a) one of the starting values adjacent to the different symbol; (b) replaces this starting value with one of the intermediate values; and (c) replaces this intermediate value with one of the final values. This process of enabling the player to select different symbols and accept or decline the final values associated with the symbols can occur on multiple occasions until a designated termination event occurs. When a designated termination event occurs, the gaming device provides an award to the player which is equal to or based on the final value associated with the symbol last selected by the player. This process can be repeated one or more times. Also, one or more selections can be selected for being revealed, where one or more of the values associated with one or more of the selections are offered to the player to accept or reject.

The gaming device, in one embodiment of the present invention, includes a game which displays a plurality of symbols to the player. The gaming device enables the player to select a designated quantity of the symbols. After selecting each symbol, the gaming device initially indicates a starting value associated with the selected symbol, then indicates at least one, and preferably a plurality of, intermediate values associated with the symbol and finally indicates the final values associated with the symbol. Each display or indication of the value is separated by a pause or a period of time. In one embodiment, after the player has made the selections, the gaming device enables the player to reselect a certain number of the selected symbols. Each of the reselected symbols is associated with an award modifier. The gaming device applies the award modifier associated with the reselected symbol to the sum of the final values displayed to the player. Finally, the gaming device provides the player with the award resulting from applying the award modifier to such sum. This type of gaming device increases the excitement and entertainment experienced by gaming device players.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention claimed is:

1. A gaming device comprising:

a memory device configured to store data which corresponds to:

(a) a game playable on one or more occasions, each one of the plays being based on a wager;

(b) a plurality of symbols;

(c) a plurality of value indicators, each one of the value indicators associated with one of the symbols, each of the value indicators displaying an initial indication of a starting value, then an indication of at least one intermediate value and then an indication of a final value; and (d) a mathematical modifier;

a display device; and a processor operatively coupled to the memory device and the display device, the processor being programmed to perform a plurality of steps for one of the plays of the game, the steps including:

(a) causing the display device to displays the symbols;

(b) receiving a player selection of a plurality of the displayed symbols;

(c) causing the display device to displays the value indicators associated with the selected symbols, said display resulting in an indication of one of the final values associated with each one of the selected symbols;

(d) receiving a player reselection of at least one of the selected symbols;

(e) as a result of the player reselection, applying the mathematical modifier to all of the displayed final values, the application of the mathematical modifier resulting in an award; and (f) displaying the award.

2. The gaming device of claim 1, wherein each of the value indicators includes a graphical representation.

3. The gaming device of claim 2, wherein each of the graphical representations includes a representation of an integer by integer numerical increase from the starting value to the intermediate value to the final value.

4. The gaming device of claim 1, wherein the player selection includes at least one symbol selection event.

5. The gaming device of claim 1, wherein: (a) the at least one reselected symbol was selected previous to the reselection of the reselected symbol; (b) at least one of the final values was determined, at least in part, as a result of the previous selection of the reselected symbol; and (c) the mathematical modifier was determined, at least in part, as a result of the reselection of the reselected symbol.

6. The gaming device of claim 1, wherein the display device includes an award display area which: (a) displays a sum of a plurality of the final values at one time; and (b) displays the award at a later time.

7. The gaming device of claim 1, wherein each of the value indicators includes a graphical representation selected from the group consisting of a wheel, a disk, a dial and a meter.

8. The gaming device of claim 1, wherein at least one of the final values is greater than or less than one of the starting values, said final value being equal to or greater than zero.

9. The gaming device of claim 1, wherein at least one of the intermediate values is greater than or less than one of the starting values.

10. The gaming device of claim 1, wherein the display device has an electronic configuration which is accessible through a network selected from the group consisting of a data network, a playing station network, a local area network, a wide area network and an internet.

11. A gaming device comprising:

a memory device configured to store data which corresponds to:

(a) a game playable on one or more occasions, each one of the plays being based on a wager;

(b) a plurality of symbols;

(c) a plurality of value indicators, each one of the value indicators associated with one of the symbols, each of the value indicators displaying an initial indication of a starting value, then an indication of at least one intermediate value and then an indication of a final value; and (d) a plurality of different mathematical modifiers;

a display; and a processor operatively coupled to the memory device and the display device, the processor being programmed to perform a plurality of steps for one of the plays of the game, the steps including:

(a) causing the display device to display the symbols;

(b) receiving at least one player selection of more than one, and less than all, of the displayed symbols;

(c) causing the display device to display the value indicators associated with the selected symbols, said display resulting in an indication of a plurality of the final values;

(d) receiving a player reselection of at least one, and less than all, of the selected symbols;

(e) selecting one of the mathematical modifiers based on the player reselection;

(f) applying the selected mathematical modifier to all of the displayed final values, the application of the mathematical modifier resulting in an award; and (g) displaying the award.

12. The gaming device of claim 11, wherein each of the value indicators includes a graphical representation.

13. The gaming device of claim 12, wherein each of the graphical representations includes a representation of an integer by integer numerical increase from the starting value to the intermediate value to the final value.

14. The gaming device of claim 12, wherein the player selection includes a symbol selection event.

15. The gaming device of claim 12, wherein: (a) the at least one reselected symbol was selected previous to the reselection of the reselected symbol; (b) at least one of the final values was determined, at least in part, as a result of the previous selection of the reselected symbol; and (c) the mathematical modifier was determined, at least in part, as a result of the reselection of the reselected symbol.

16. The gaming device of claim 12, wherein the display device includes an award display area which: (a) displays a sum of a plurality of the final values at one time; and (b) displays the award at a later time.

17. The gaming device of claim 12, wherein each of the value indicators includes a graphical representation selected from the group consisting of a wheel, a disk, a dial and a meter.

18. The gaming device of claim 12, wherein at least one of the final values is greater than or less than one of the starting values, said final value being equal to or greater than zero.

19. The gaming device of claim 12, wherein at least one of the intermediate values is greater than or less than one of the starting values.

20. The gaming device of claim 12, wherein the display device has an electronic configuration which is accessible through a network selected from the group consisting of a data network, a playing station network, a local area network, a wide area network and an internet.

21. A gaming device comprising:

a memory device configured to store data which corresponds to:

(a) a game playable on one more occasions, each one of the plays being based on a wager;

(b) a group of symbols;

(c) a first selection opportunity enabling a player to select a quantity of more than one of the symbols in the group during one of the plays to cause a sum of final values to be calculated, said quantity being less than all of the symbols in the group;

(d) a plurality of value indicators, each one of the value indicators associated with one of the selected symbols, each of the value indicators displaying a numerical increase including an initial indication of a starting value, then an indication of a plurality of different intermediate values and then an indication of one of the final values;

(e) a plurality of different award modifiers associated with the selected symbols;

(f) a second selection opportunity enabling the player to reselect at least one of the selected symbols in the group during the one play, the reselection resulting in a determination of one of the award modifiers; and (g) an award based, at least in part, on the reselection, the award being determined by applying the determined award modifier to the sum; and a display device operatively coupled to the memory device, the display device being adapted to display the symbols, the value indicators and the award to the player.

22. The gaming device of claim 21, wherein each of the value indicators includes a graphical representation.

23. The gaming device of claim 21, wherein each of the value indicators includes a graphical representation selected from the group consisting of a wheel, a disk, a dial and a meter.

24. The gaming device of claim 21, wherein at least one of the final values is greater than or less than one of the starting values.

25. The gaming device of claim 21, wherein at least one of the intermediate values is greater than or less than one of the starting values.

26. The gaming device of claim 21, wherein each of the award modifiers includes an award increaser.

27. The gaming device of claim 21, wherein the numerical increase includes an integer-by-integer increase.

28. The gaming device of claim 21, which includes a plurality of value indicators associated with each of the symbols in the group which are not selected by the player, each of the value indicators indicating a final value which will not be included in the sum.

29. The gaming device of claim 21, wherein the display device has an electronic configuration which is accessible through a network selected from the group consisting of a data network, a playing station network, a local area network, a wide area network and an internet.

30. A method for operating a gaming device comprising:

(a) starting a play of a game, wherein the play is based on a wager;

(b) displaying a group of symbols for the play;

(c) enabling a player to select a designated quantity of more than one of the symbols during the play;

(d) associating each one of a plurality of value indicators with one of the selected symbols;

(e) causing each one of the value indicators to indicate a starting value in association with one of the selected symbols;

(f) enabling a first period of time to lapse;

(g) causing each one of the value indicators to indicate at least one intermediate value in association with one of the selected symbols;

(h) enabling a second period of time to lapse;

(i) causing each one of the value indicators to indicate a final value in association with one of the selected symbols;

(j) enabling the player to reselect at least one of the selected symbols during the play;

(k) retrieving a mathematical modifier based on associated with the reselection;

(l) determining an award based, at least in part, on the reselection, by applying the retrieved mathematical modifier to all of the indicated final values; and (m) providing the award to the player.

31. The method of claim 30, wherein the steps (e) through (i) include the step of graphically representing an integer-by-integer numerical increase.

32. The method of claim 31, wherein the starting value is replaced by the intermediate value and the intermediate value is replaced by the final value.

33. The method of claim 30, which includes the step of alternately conducting: (x) steps (e) through (i) for a first one of the selected symbols; and (y) steps (e) through (i) for a second one of the selected symbols.

34. The method of claim 30, wherein the step of determining an award includes the step of determining an amount which is greater than or less than a sum of the indicated final values.

35. A method for operating a gaming device comprising:

(a) starting a play of a game, wherein the play is based on a wager;

(b) displaying a group of symbols;

(c) enabling a player to select a first one of the symbols during the play;

(d) associating one of a plurality of value indicators with the first symbol;

(e) causing the value indicator to indicate a starting value in association with the first symbol;

(f) enabling a first period of time to lapse;

(g) causing the value indicator to indicate at least one intermediate value in association with the first symbol;

(h) enabling a second period of time to lapse;

(i) causing the value indicator to indicate a final value in association with the first symbol;

(j) enabling the player to select a second one of the symbols during the play;

(k) associating another one of the value indicators with the second symbol;

(l) causing said value indicator to indicate a starting value in association with the second symbol;

(m) enabling a third period of time to lapse;

(n) causing the value indicator to indicate at least one intermediate value in association with the second symbol;

(o) enabling a fourth period of time to lapse;

(p) causing the value indicator to indicate a final value in association with the second symbol;

(q) enabling the player to reselect at least one of the first and second symbols during the play;

(r) retrieving at least one mathematical modifier based on the reselection;

(s) determining an award for the play based, at least in part, on the reselection, by applying the retrieved mathematical modifier to all of the indicated final values; and (t) providing the award to the player.

36. The method of claim 35, wherein the steps (e) through (i) include the step of graphically representing an integer-by-integer numerical increase.

37. The method of claim 36, wherein the steps (l) through (p) include the step of graphically representing an integer-by-integer numerical increase.

38. The method of claim 37, wherein each of the starting values is replaced by one of the intermediate values and each of the intermediate values is replaced by one of the final values.

39. The method of claim 35, wherein the step of determining an award includes the step of determining an amount which is greater than or less than a sum of the indicated final values.

40. A gaming device comprising:

a memory device configured to store data which corresponds to:

(a) a game playable on one or more occasions, each one of the plays being based on a wager;

(b) a plurality of symbols; and (c) a plurality of value indicators, each one of the value indicators associated with one of the symbols, each of the value indicators displaying an initial indication of a starting value, then an indication of at least one intermediate value and then an indication of a final value;

a display device; and a processor operatively coupled to the memory device and the display device, the processor being programmed to perform a plurality of steps for one of the plays of the game, the steps including:

(a) causing the display device to display the symbols;

(b) receiving at least one player selection of more than one, and less than all, of the displayed symbols;

(c) as a result of the at least one player selection, determining one of the final values for each one of the selected symbols;

(d) causing the display device to display the value indicators associated with the selected symbols, said display ending with an indication of the determined final values;

(e) receiving a player reselection of at least one, and less than all, of the selected symbols, a previous selection of the at least one reselected symbol having had an affect on the determination of the final values;

(f) as a result of the player reselection, selecting one of the mathematical modifiers;

(g) cause the display device to indicate the selected mathematical modifier for a first time only after the player reselection;

(h) applying the indicated mathematical modifier to all of the displayed final values, the application of the indicated mathematical modifier resulting in an award; and (i) displaying the award.

41. The gaming device of claim 40, wherein each of the value indicators includes a graphical representation.

42. The gaming device of claim 40, wherein each of the graphical representations includes a representation of an integer by integer numerical increase from the starting value to the intermediate value to the final value.

43. The gaming device of claim 40, wherein the award is based, at least in part, on: (a) the previous selection of the reselected symbol; and (b) the reselection of the reselected symbol.

44. The gaming device of claim 40, wherein each of the value indicators includes a graphical representation selected from the group consisting of a wheel, a disk, a dial and a meter.

45. The gaming device of claim 40, wherein at least one of the final values is greater than or less than one of the starting values, said final value being equal to or greater than zero.

46. The gaming device of claim 40, wherein at least one of the intermediate values is greater than or less than one of the starting values.

47. The gaming device of claim 40, wherein the display device has an electronic configuration which is accessible through a network selected from the group consisting of a data network, a playing station network, a local area network, a wide area network and an internet.

* * * * *

UNITED STATES PATENT AND TRADEMARK OFFICE

CERTIFICATE OF CORRECTION

PATENT NO. : 7,361,088 B2
APPLICATION NO. : 10/661209
DATED : April 22, 2008
INVENTOR(S) : Darren Maya et al.

It is certified that error appears in the above-identified patent and that said Letters Patent is hereby corrected as shown below:

IN THE SPECIFICATION:

In Column 19, Line 58 change “displays” to --display--.

In Column 19, Line 61 change “displays” to --display--.

In Column 22, Line 56 delete “associated with”.

Signed and Sealed this

Eleventh Day of November, 2008

JON W. DUDAS
*Director of the United States Patent and Trademark Office*